(12) United States Patent
Ping et al.

(10) Patent No.: US 11,258,810 B2
(45) Date of Patent: Feb. 22, 2022

(54) IDENTITY AUTHENTICATION METHOD, APPARATUS, AND SYSTEM

(71) Applicant: Tencent Technology (Shenzhen) Company Limited, Shenzhen (CN)

(72) Inventors: Tang Yan Ping, Guangdong (CN); Zhang Yan Ling, Guangdon (CN); Wang Yu Ye, Guangdong (CN); Gong Ling, Guangdong (CN); Huang Jia Qi, Guangdong (CN); Wei Ren Jia, Guangdong (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 16/709,416

(22) Filed: Dec. 10, 2019

(65) Prior Publication Data
US 2020/0153844 A1 May 14, 2020

Related U.S. Application Data

(63) Continuation of application No. 15/690,469, filed on Aug. 30, 2017, now Pat. No. 10,547,624, which is a (Continued)

(30) Foreign Application Priority Data

Nov. 16, 2015 (CN) .......................... 201510786095.9
Nov. 16, 2015 (CN) .......................... 201510786124.1

(51) Int. Cl.
*H04L 29/06* (2006.01)
*G06F 21/31* (2013.01)
*G06F 21/36* (2013.01)

(52) U.S. Cl.
CPC ........ *H04L 63/1416* (2013.01); *G06F 21/316* (2013.01); *G06F 21/36* (2013.01);
(Continued)

(58) Field of Classification Search
CPC .......... G06F 2221/2133; G06F 21/316; G06F 21/36; H04L 63/1416; H04L 63/08; H04L 63/1425; H04L 63/142
(Continued)

(56) References Cited

U.S. PATENT DOCUMENTS 8,621,578 B1 * 12/2013 Blomquist .......... H04L 63/0861
726/5
2005/0054445 A1   3/2005 Gatto et al.
(Continued)

FOREIGN PATENT DOCUMENTS

CN       101789947 A       7/2010
CN       102184359 A       9/2011
(Continued)

OTHER PUBLICATIONS

International Search Report and Written Opinion with English translations dated Sep. 13, 2016 for PCT Application No. PCT/CN2016/086678, 21 pages.
(Continued)

*Primary Examiner* — Jacob Lipman
(74) *Attorney, Agent, or Firm* — Crowell & Moring LLP

(57) ABSTRACT

A method may be performed using a server. The method may include receiving an identity authentication request associated with a user, generating authentication information based on the identity authentication request, and generating candidate information based on the authentication information such that the authentication information is a subset of the candidate information. The candidate information may be displayed at a randomly selected location. The user may provide input through a graphic input interface to select the authentication information from among the candidate information.

20 Claims, 17 Drawing Sheets

Related U.S. Application Data continuation of application No. PCT/CN2016/086678, filed on Jun. 22, 2016.

(52) U.S. Cl.
CPC .......... *H04L 63/08* (2013.01); *H04L 63/1425* (2013.01); *H04L 63/20* (2013.01); *G06F 2221/2133* (2013.01)

(58) Field of Classification Search
USPC ............................................................ 726/7
See application file for complete search history.

(56) References Cited

U.S. PATENT DOCUMENTS

| | | | | |
|---|---|---|---|---|
| 2008/0072293 | A1* | 3/2008 | D'Urso | G06F 21/31 726/4 |
| 2009/0077653 | A1* | 3/2009 | Osborn | G06F 21/36 726/17 |
| 2009/0178125 | A1 | 7/2009 | Barber et al. | |
| 2010/0100962 | A1* | 4/2010 | Boren | H04L 63/1433 726/25 |
| 2010/0228804 | A1* | 9/2010 | Dasgupta | G06F 16/951 345/557 |
| 2012/0011564 | A1* | 1/2012 | Osborn | G06F 21/36 726/2 |
| 2012/0132706 | A1 | 5/2012 | McKenzie | |
| 2012/0167204 | A1 | 6/2012 | Akka | |
| 2014/0282870 | A1* | 9/2014 | Markwordt | G06Q 20/384 726/3 |

FOREIGN PATENT DOCUMENTS

| | | |
|---|---|---|
| CN | 102594811 A | 7/2012 |
| CN | 102737019 A | 10/2012 |
| CN | 102790674 A | 11/2012 |
| CN | 103455965 A | 12/2013 |
| CN | 104348809 A | 2/2015 |
| CN | 104580117 A | 4/2015 |
| CN | 104794385 A | 7/2015 |
| CN | 104902008 A | 9/2015 |

OTHER PUBLICATIONS

Office Action dated Feb. 27, 2019 with concise English translation for Chinese Application No. 201510786095.9, 10 pages.
Office Action dated May 14, 2019 for Chinese Application No. 201510786095.9 with concise English Translation, 9 pages.
Office Action dated Jun. 13, 2019 for Chinese Application No. 201510786124.1 with concise English Translation, 11 pages.
Office Action dated Nov. 7, 2019 for Chinese Application No. 201510786124.1 with concise English Translation, 7 pages.

* cited by examiner

330

340

Normal state      Authenticating      Authentication succeeds

IDENTITY AUTHENTICATION METHOD, APPARATUS, AND SYSTEM

CROSS-REFERENCE TO RELATED APPLICATION(S)

This application is a continuation of U.S. patent application Ser. No. 15/690,469 filed Aug. 30, 2017, which is a continuation of Patent Cooperation Treaty Patent Application No. PCT/CN2016/086678, filed Jun. 22, 2016, which claims priority to both Chinese Patent Applications No. 2015107860959 and No. 2015107861241, filed with the Chinese Patent Office on Nov. 16, 2015, all of which are incorporated by reference herein in their entirety.

FIELD OF THE TECHNOLOGY

The present application relates to the field of communications technologies, and more specifically to an identity authentication method, apparatus, and system.

BACKGROUND OF THE DISCLOSURE

Various data are involved in people's life. For example, data processing and data sharing occurs in online shopping, electronic money transfers, and electronic chatting. The safety of people's lives and property rely on reliable data security.

In an effort to prevent brute force login attempts by an automated computer program, the CAPTCHA (Completely Automated Public Turing test to tell Computers and Humans Apart) security test has been developed. A CAPTCHA security test is used to determine whether a human or a machine is entering authentication information, thereby improving authentication security. CAPTCHAs require a manual input of data, which in turn may improve data security by a particular degree, but at the same time make operations of users increasingly complex. As a result, processing efficiency of authentication is reduced. Moreover, a conventional CAPTCHA usually includes a small character image and an entry box. Therefore, an illegal intruder may directly pull an image of a CAPTCHA very easily by using a technical solution, and then perform cracking by using an automaton. Therefore, a CAPTCHA schema still has particular vulnerabilities.

SUMMARY

Embodiments of the present disclosure provide an identity authentication method, apparatus, and system, so that at the same time when data security is improved, user operations can be simplified, thereby improving processing efficiency of a computing device running the identity authentication.

An embodiment of the present disclosure provides an identity authentication method, including:
  receiving a security authentication request sent by a terminal;
  acquiring network environment information and user behavior data according to the security authentication request;
  determining, according to the network environment information and the user behavior data, whether a current operation is a machine attack; and
  acquiring a CAPTCHA of a predetermined type according to a predetermined policy and delivering the CAPTCHA to the terminal if the current operation is a machine attack, to perform identity authentication; or
  determining that security authentication succeeds if the current operation is not a machine attack.

Correspondingly, an embodiment of the present disclosure further provides another identity authentication method, including:
  generating a security authentication request when a security authentication interface is triggered;
  sending the security authentication request to a server, so that the server checks, according to the security authentication request, whether a current operation is a machine attack;
  receiving a CAPTCHA returned by the server when the server determines that the current operation is a machine attack, where the CAPTCHA is obtained after the server acquires the CAPTCHA of a predetermined type according to a predetermined policy;
  generating a CAPTCHA input interface according to the CAPTCHA; and
  displaying the CAPTCHA and the CAPTCHA input interface according to a preset policy.

Correspondingly, an embodiment of the present disclosure further provides an identity authentication apparatus, including:
  a receiving unit, configured to receive a security authentication request sent by a terminal;
  an acquiring unit, configured to acquire network environment information and user behavior data according to the security authentication request; and
  an authentication unit, configured to: determine, according to the network environment information and the user behavior data, whether a current operation is a machine attack; and acquire a CAPTCHA of a predetermined type according to a predetermined policy and deliver the CAPTCHA to the terminal if the current operation is a machine attack, to perform identity authentication; or determine that security authentication succeeds if the current operation is not a machine attack.

Correspondingly, an embodiment of the present disclosure further provides an identity authentication triggering apparatus, including:
  a triggering unit, configured to generate a security authentication request when a security authentication interface is triggered;
  a sending unit, configured to send the security authentication request to a server, so that the server checks, according to the security authentication request, whether a current operation is a machine attack;
  a receiving unit, configured to receive a CAPTCHA returned by the server when the server determines that the current operation is a machine attack, where the CAPTCHA is obtained after the server acquires the CAPTCHA of a predetermined type according to a predetermined policy;
  a generation unit, configured to generate a CAPTCHA input interface according to the CAPTCHA; and
  a display unit, configured to display the CAPTCHA and the CAPTCHA input interface according to a preset policy.

In addition, an embodiment of the present disclosure further provides an identity authentication system, including any identity authentication apparatus and any identity authentication triggering apparatus provided in the embodiments of the present application.

In addition, an embodiment of the present disclosure further provides a storage medium, storing processor executable instructions, the processor executable instructions being used to perform the following operations:
  receiving a security authentication request sent by a terminal;

acquiring network environment information and user behavior data according to the security authentication request;

determining, according to the network environment information and the user behavior data, whether a current operation is a machine attack; and acquiring a CAPTCHA of a predetermined type according to a predetermined policy and delivering the CAPTCHA to the terminal if the current operation is a machine attack, to perform identity authentication; or determining that security authentication succeeds if the current operation is not a machine attack.

Correspondingly, an embodiment of the present disclosure further provides another storage medium, storing processor executable instructions, the processor executable instructions being used to perform the following operations:

generating a security authentication request when a security authentication interface is triggered;

sending the security authentication request to a server, so that the server checks, according to the security authentication request, whether a current operation is a machine attack;

receiving a CAPTCHA returned by the server when the server determines that the current operation is a machine attack, where the CAPTCHA is obtained after the server acquires the CAPTCHA of a predetermined type according to a predetermined policy;

generating a CAPTCHA input interface according to the CAPTCHA; and displaying the CAPTCHA and the CAPTCHA input interface according to a preset policy.

According to the embodiments of the present disclosure, when a security authentication request sent by a terminal is received, network environment information and user behavior data are acquired according to the security authentication request; it is then determined, according to the network environment information and the user behavior data, whether a current operation is a machine attack; and a CAPTCHA of a predetermined type is acquired according to a predetermined policy and the CAPTCHA is delivered to the terminal if the current operation is a machine attack, to perform identity authentication; or it is determined that security authentication succeeds if the current operation is not a machine attack. In the solution, security authentication can be performed on a current operation, and a CAPTCHA is delivered only when it is determined that the current operation is a machine attack. Therefore, compared with a solution in which CAPTCHA authentication needs to be performed in all cases in the existing technology, user operations can be greatly simplified, thereby improving processing efficiency of authentication. Moreover, the CAPTCHA is temporarily delivered and has flexible types. Therefore, it is difficult to perform cracking by using an automaton, and as compared with an existing solution, security of the solution can be greatly improved.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present application, and a person of ordinary skill in the art may still derive other drawings from these accompanying drawings without going beyond the scope of the present disclosure.

DESCRIPTION OF EMBODIMENTS

The following clearly and completely describes the technical solutions in the embodiments of the present disclosure with reference to the accompanying drawings in the embodiments of the present disclosure. Apparently, the described embodiments are only some of the embodiments of the present disclosure rather than all of the embodiments. All other embodiments obtained by a person of ordinary skill in the art based on the embodiments of the present disclosure falls within the scope of the present disclosure.

Embodiments of the present disclosure provide an identity authentication method, apparatus, and system.

Figure 1A:
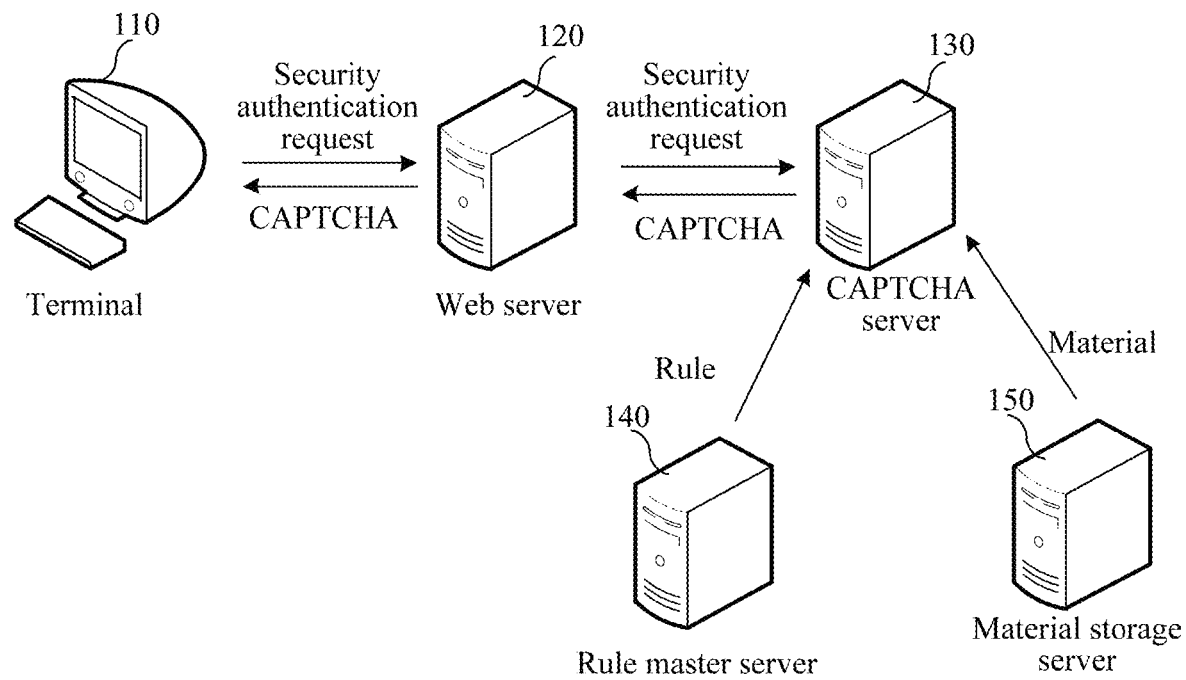
FIG. 1A is a schematic diagram of a scenario of an identity authentication system according to an embodiment of the present application.

An identity authentication system may include any identity authentication apparatus and any identity authentication triggering apparatus provided in the embodiments of the present disclosure. The identity authentication apparatus may be integrated in a server. The server may be one independent entity, or may include multiple entities. As shown in FIG. 1A, the server may include a web server 120 and a CAPTCHA server 130. In addition, optionally, the server may further include a rule master server 140, a material storage server 150, and the like. In addition, the identity authentication apparatus may be integrated in a terminal 110, for example, may be installed on the terminal in a form of a client. The terminal is, for example, a mobile phone, a tablet computer or a personal computer (PC), or other computing device.

When a user needs to perform security authentication, for example, when the user clicks a security authentication trigger button, the terminal 110 in which the identity authentication triggering apparatus is located generates a security authentication request, and sends the security authentication request to the server, for example, the web server 120. The server acquires network environment information and user behavior data according to the security authentication request, and determines, according to the network environment information and the user behavior data, whether a current operation is a machine attack. For example, the web server 120 may forward the security authentication request to the CAPTCHA server 130. The CAPTCHA server 130 acquires the network environment information and the user behavior data; determines, according to the network environment information and the user behavior data, whether the current operation is a machine attack; and acquires a CAPTCHA of a predetermined type according to a predetermined policy and delivers the CAPTCHA to the terminal if the current operation is a machine attack. For example, the CAPTCHA server 130 may acquire the predetermined policy, for example, a rule, from the rule master server 140 and acquire a corresponding material from the material storage server 150. The CAPTCHA server generates the CAPTCHA according to the predetermined policy and the material, and then provides the CAPTCHA to the web server 120. The web server 120 delivers the CAPTCHA to the terminal 110. The terminal 110 generates a CAPTCHA input interface according to the CAPTCHA, and displays the CAPTCHA and the CAPTCHA input interface according to a preset policy, to perform identity authentication. The server determines that security authentication succeeds if the current operation is not a machine attack, but does not need to deliver the CAPTCHA. In this case, the server may return a response that indicates that security authentication succeeds to the terminal.

Detailed description is provided below.

Embodiment 1

This embodiment is described from the perspective of an identity authentication apparatus. The identity authentication apparatus may be specifically integrated in a network device such as a server. The server may be one independent entity, or may include multiple entities.

An identity authentication method includes: receiving a security authentication request sent by a terminal; acquiring network environment information and user behavior data according to the security authentication request; determining, according to the network environment information and the user behavior data, whether a current operation is a machine attack; and acquiring a CAPTCHA of a predetermined type according to a predetermined policy and delivering the CAPTCHA to the terminal if the current operation is a machine attack, to perform identity authentication; or determining that security authentication succeeds if the current operation is not a machine attack.

Figure 1B:
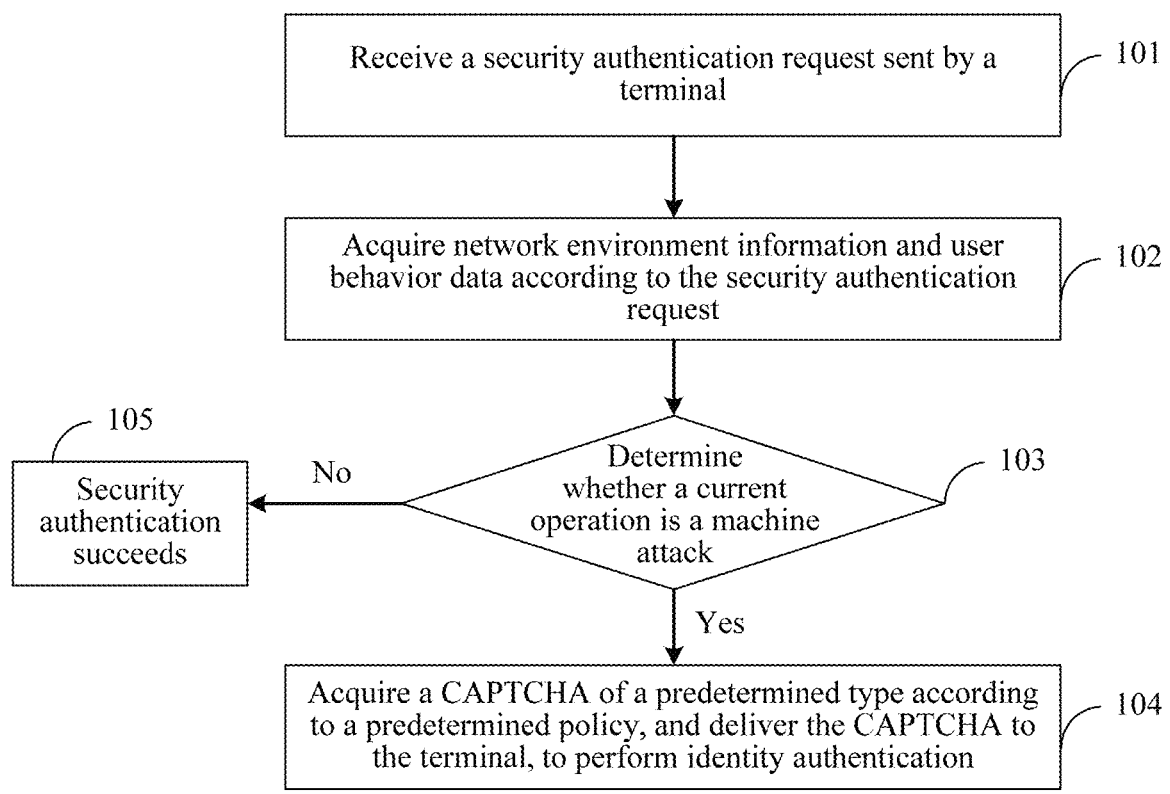
FIG. 1B is a flowchart of an identity authentication method according to an embodiment of the present application.

As shown in FIG. 1B, a flowchart 100 of the identity authentication method may be specifically as follows:

101: Receive a security authentication request sent by a terminal.

102: Acquire network environment information and user behavior data according to the security authentication request.

For example, a web page environment and a user behavior may be specifically monitored, to acquire the network environment information and the user behavior data.

The network environment information may include data such as a network behavior model parameter and a web page environment model parameter, and the user behavior data may include data such as a user behavior model parameter.

103: Determine, according to the network environment information and the user behavior data, whether a current operation is a machine attack; and perform step 104 if the current operation is a machine attack; or perform step 105 if the current operation is not a machine attack.

For example, a network behavior model parameter and a web page environment model parameter may be specifically retrieved from the network environment information, and a user behavior model parameter may be retrieved from the user behavior data. Then analysis is performed according to the network behavior model parameter, the web page environment model parameter, and the user behavior model parameter and according to a predetermined analysis model. It is determined, according to an analysis result, whether the current operation is a machine attack. Perform step 104 if the current operation is a machine attack. Perform step 105 if the current operation is not a machine attack.

It should be noted that, in this embodiment of the present application, the "determining to be a machine attack" may be understood as "a possibility that the behavior is a machine attack is greater than a particular threshold", that is, that "it is determined, according to an analysis result, whether the current operation is a machine attack" is specifically:

estimating, according to the analysis result, a probability that the current operation is a machine attack, and determining that the current operation is a machine attack if the probability is greater than a predetermined threshold, or determining that the current operation is a non-machine attack if the probability is not greater than a predetermined threshold.

Optionally, to make it easy for a user to know a current state, when performing authentication, a server may further return corresponding prompt information to the terminal, to indicate that authentication is being performed, that is, during the step of "determining, according to the network environment information and the user behavior data, whether a current operation is a machine attack", the identity authentication method may further include:

sending prompt information that indicates that authentication is being performed to the terminal, so that the terminal switches, according to the prompt information, a display status of a current page to a first state, where the first state indicates that security authentication is being performed.

For example, in this case, the terminal may display "Authenticating" or the like on a page or at a preset location of a security authentication trigger button.

104: Acquire a CAPTCHA of a predetermined type according to a predetermined policy, and deliver the CAPTCHA to the terminal, to perform identity authentication.

The predetermined policy may be set according to a requirement of an actual application. For example, the CAPTCHA of the predetermined type may be acquired by using any manner in the following. That is, the step of "acquiring a CAPTCHA of a predetermined type according to a predetermined policy" may be specifically as follows:

(1) First Manner

Evaluate a possibility that the current operation is a machine attack, and acquire a CAPTCHA of a corresponding type according to an evaluation result.

For example, several levels may be set according to a value (for example, a malicious degree of a current environment) of a probability of a machine attack. When a probability that the operation is determined to be a machine attack is higher, a level is higher, and a CAPTCHA with higher security such as a puzzle CAPTCHA and a click-character-in-image CAPTCHA may be used. In contrast, when a probability that the operation is determined as a machine attack is lower, a level is lower, and a relatively simple CAPTCHA with lower security such as a conventional character CAPTCHA may be used.

(2) Second Manner

A CAPTCHA of a type is randomly selected from CAPTCHAs of different types. A CAPTCHA of a type is randomly selected no matter how high a probability that the operation is determined to be a machine attack is. The CAPTCHA may be a puzzle CAPTCHA, or may be a conventional character CAPTCHA or the like.

(3) Third Manner

Acquire a service identifier corresponding to the current operation, and acquire a CAPTCHA of a corresponding type according to the service identifier.

For example, different CAPTCHA generation policies may be set for different services according to requirements of actual applications. For example, for a service such as payment that has relatively high security requirement, a relatively complex CAPTCHA with relatively high security such as a puzzle CAPTCHA needs to be provided. In contrast, for an ordinary service such as web page browsing, only a CAPTCHA with relatively low security such as a conventional character CAPTCHA may be provided.

It should be noted that the predetermined policy may be stored in the identity authentication apparatus, or may be stored in another storage device. When needing the predetermined policy, the identity authentication apparatus acquires the predetermined policy from the storage device. In addition, it should further be noted that, a material for generating a CAPTCHA may be stored in the identity authentication apparatus, and alternatively, another device may provide the material for generating a CAPTCHA to the identity authentication apparatus. Details are not further described herein.

Optionally, after the CAPTCHA is delivered to the terminal, an identity authentication request sent by the terminal may further be received. For ease of description, in this embodiment of the present application, the identity authentication request is referred to as a first identity authentication request. The first identity authentication request may carry information such as CAPTCHA input information and authentication information of a user. Identity authentication is then performed according to the first identity authentication request. That is, after the step of "delivering the CAPTCHA to the terminal", the identity authentication method may further include:

receiving the first identity authentication request sent by the terminal, where the first identity authentication request carries the CAPTCHA input information and the authentication information of the user, and determining that identity authentication succeeds if the authentication information is correct and the CAPTCHA input information is the same as the CAPTCHA; or determining that identity authentication fails if the authentication information is incorrect or the CAPTCHA input information is not the same as the CAPTCHA.

Optionally, to improve data security, another manner may further be used for the delivered CAPTCHA. For example, the step of "delivering the CAPTCHA to the terminal" may include:

receiving a third identity authentication request of a user; generating authentication information and candidate information according to the third identity authentication request, where the authentication information and the candidate information have a predetermined correspondence; and displaying the candidate information at a random location on a preset graphics input interface, and displaying the authentication information on a preset authentication interface.

In this case, after the step of "delivering the CAPTCHA to the terminal", the identity authentication method may further include: acquiring candidate information selected by the user from the preset graphics input interface, to obtain input information; then determining whether the input information matches the authentication information; and determining that identity authentication succeeds if the input information matches the authentication information; or rejecting the third identity authentication request if the input information does not match the authentication information. For details, refer to subsequent Embodiment 7 to Embodiment 12. Details are not further described herein.

105: Determine that security authentication succeeds.

Optionally, a response that indicates that security authentication succeeds may be returned to the terminal, so that the terminal switches, according to the response, a display status of a current page to a second state, where the second state indicates that security authentication succeeds.

After the security authentication succeeds, the identity authentication apparatus may further receive an identity authentication request sent by the terminal. For ease of description, in this embodiment of the present application, the identity authentication request is referred to as a second identity authentication request. The second identity authentication request carries authentication information of a user (but does not need to carry the CAPTCHA). Then, identity authentication is performed according to the second identity authentication request. That is, after the step of "determining that security authentication succeeds", the identity authentication method may further include:

receiving the second identity authentication request sent by the terminal, where the second identity authentication request carries the authentication information of the user, and determining that identity authentication succeeds if the authentication information is correct; or determining that identity authentication fails if the authentication information is incorrect.

As can be seen, in this embodiment, when a security authentication request sent by a terminal is received, network environment information and user behavior data are acquired according to the security authentication request. It is then determined, according to the network environment information and the user behavior data, whether a current operation is a machine attack. A CAPTCHA of a predetermined type is acquired according to a predetermined policy and the CAPTCHA is delivered to the terminal if the current operation is a machine attack, to perform identity authentication. It is determined that security authentication succeeds if the current operation is not a machine attack. In the solution, security authentication can be performed on a current operation, and a CAPTCHA is delivered only when it is determined that the current operation is a machine attack. Therefore, compared with a solution in which CAPTCHA authentication needs to be performed in all cases in the existing technology, user operations can be greatly simplified, thereby improving processing efficiency of authentication. Moreover, the CAPTCHA is temporarily delivered and has flexible types. Therefore, it is difficult to perform cracking by using an automaton, and as compared with an existing solution, security of the solution can be greatly improved.

In addition, a user may select whether to trigger a security authentication operation. Therefore, compared with a solution in which a system background directly performs detection in the existing technology, implementation is more flexible, user operations become convenient, and moreover user experience can be greatly improved, thereby improving quality of service (QoS).

Embodiment 2

This embodiment is described from the perspective of an identity authentication triggering apparatus. The identity authentication triggering apparatus may be specifically integrated in a network device such as a terminal. The terminal may be specifically a device such as a mobile phone, a tablet computer or a PC.

An identity authentication method includes: sending a security authentication request to a server, so that the server checks, according to the security authentication request, whether a current operation is a machine attack; receiving a CAPTCHA returned by the server when the server determines that the current operation is a machine attack; generating a CAPTCHA input interface according to the CAPTCHA; and displaying the CAPTCHA and the CAPTCHA input interface according to a preset policy.

Figure 2:
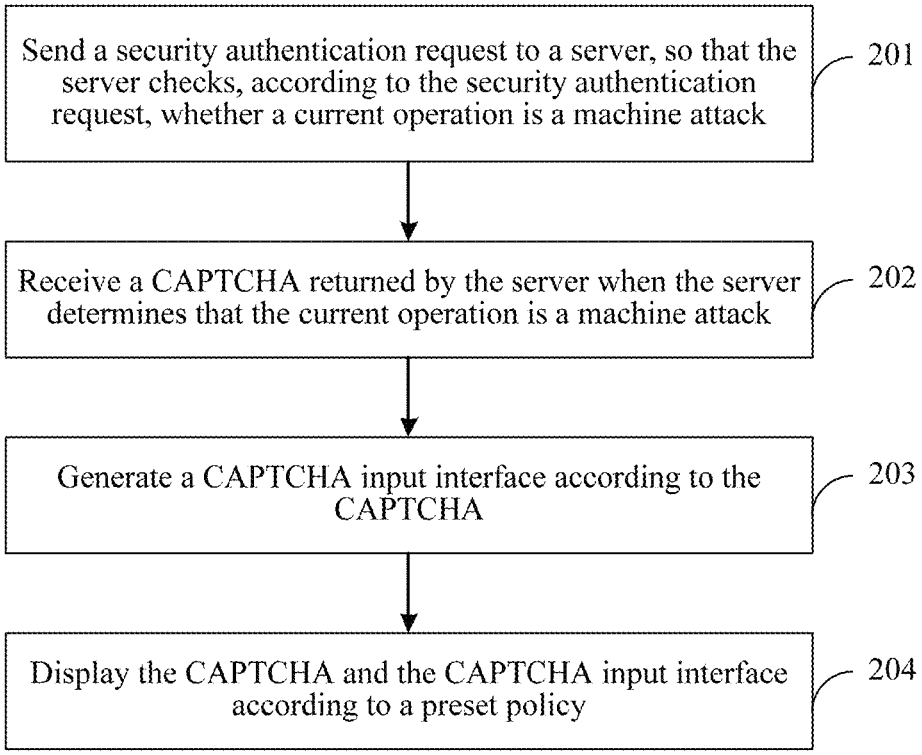
FIG. 2 is another flowchart of an identity authentication method according to an embodiment of the present application.

As shown in FIG. 2, a specific flowchart 200 of the identity authentication method may be as follows:

201: Send a security authentication request to a server, so that the server checks, according to the security authentication request, whether a current operation is a machine attack. For a specific check method, refer to Embodiment 1. Details are not further described herein.

For example, the security authentication request may be generated when a security authentication interface is triggered, and the security authentication request is then sent to the server. The security authentication interface may be indicated in various forms, and may be, for example, an entry box or a list box of an instruction or a security authentication trigger button. The security authentication trigger button may be a button, or may be a slider or the like. Details are not further described herein. For ease of description, in this embodiment of the present application, an example in which the security authentication interface is specifically the security authentication trigger button is used to perform description.

If the security authentication interface is the security authentication trigger button, the step of "generating a security authentication request when a security authentication interface is triggered" may include:

receiving a security authentication instruction triggered when a user operates the security authentication trigger button, and generating the security authentication request according to the security authentication instruction.

The user may operate the security authentication trigger button in various manners, for example, may perform a click, a slide, a touch or the like.

Optionally, after the security authentication request is sent to the server, to make it easy for a user to know a current state, the identity authentication method may further include:

receiving prompt information that is sent by the server and indicates that authentication is being performed, and switching, according to the prompt information, a display status of a current page to a first state, where the first state indicates that security authentication is being performed.

For example, in this case, a terminal may display a word "Authenticating" or the like on the current page or at a preset location of the security authentication trigger button.

202: Receive a CAPTCHA returned by the server when the server determines that the current operation is a machine attack.

A form of the CAPTCHA is not limited. Various types of CAPTCHAs may be used. For example, the CAPTCHA may be a puzzle CAPTCHA, an image CAPTCHA or a character CAPTCHA.

It should be noted that, in this embodiment of the present application, the "determining to be a machine attack" may be understood as "a possibility that the operation is a machine attack is greater than a particular threshold", that is, a probability that the operation is determined to be a machine attack is greater than a particular threshold.

In addition, it should further be noted that, the CAPTCHA may include various types of information, for example, may include authentication information and candidate information. For example, the step of "receiving a CAPTCHA returned by the server when the server determines that the current operation is a machine attack" may specifically include:

sending a third identity authentication request to the server; and receiving the authentication information and the candidate information that are returned by the server according to the third identity authentication request. For details, refer to related description in Embodiment 7 to Embodiment 12.

203: Generate a CAPTCHA input interface according to the CAPTCHA.

204: Display the CAPTCHA and the CAPTCHA input interface according to a preset policy.

The preset policy may be set according to a requirement of an actual application, which may be, for example, as follows:

generating a pull-down box/side box according to the security authentication trigger button, and displaying the CAPTCHA and the CAPTCHA input interface in the pull-down box/side box, which may be, for example, as follows:

dynamically opening the pull-down box/side box, and displaying the CAPTCHA and the CAPTCHA input interface in the opened pull-down box/side box.

A form of displaying the CAPTCHA and the CAPTCHA input interface may depend on a requirement of an actual application. For example, the CAPTCHA input interface may be set to be an entry box or the like. Optionally, to improve security, when the CAPTCHA is displayed, corresponding interference information may further be set for the CAPTCHA. For example, a particular background image may be set for the CAPTCHA, the CAPTCHA is particularly deformed, or the like. Details are not further described herein.

Optionally, after the displaying the CAPTCHA and the CAPTCHA input interface according to a preset policy, a user may further input corresponding CAPTCHA input information in the CAPTCHA input interface according to the displayed CAPTCHA. For example, if the CAPTCHA is "12ab", the user may input "12ab" in the CAPTCHA input interface. Then, the identity authentication triggering apparatus sends a first identity authentication request to the server, and adds the CAPTCHA input information and authentication information to the first identity authentication request, so that the server performs identity authentication according to the CAPTCHA input information and the authentication information. That is, after the step of "displaying the CAPTCHA and the CAPTCHA input interface according to a preset policy", the method may further include:

acquiring the authentication information of the user, acquiring the CAPTCHA input information by using the CAPTCHA input interface, and sending the first identity authentication request to the server, where the first identity authentication request carries the CAPTCHA input information and the authentication information, so that the server performs identity authentication according to the CAPTCHA input information and the authentication information.

Subsequently, a response that is returned by the server and is about an identity authentication result, for example, that identity authentication succeeds or that identity authentication fails, may further be received. Then the identity authentication result is displayed. When identity authentication fails, a corresponding failure cause, for example, an authentication information error or a CAPTCHA error, may further be prompted to the user.

The authentication information refers to information, other than a CAPTCHA, used for identity authentication. For example, the authentication information may include a user account and a password or may further include other information such as a user name.

In addition, it should be noted that, the identity authentication triggering apparatus may further receive a response that is returned by the server when the server determines that the current operation is a non-machine attack and indicates that security authentication succeeds, and switch, according to the response, a display status of a current page to a second state, where the second state indicates that security authentication succeeds. For example, the identity authentication triggering apparatus may generate security-authentication success prompt information according to the response that indicates that security authentication succeeds, and display the security-authentication success prompt information, for example, display words "Security authentication succeeds" or the like.

The user may only need to provide the authentication information and does not need to input the CAPTCHA if security authentication succeeds, that is, after the step of "switching, according to the response, a display status of a current page to a second state", the identity authentication method may further include:

acquiring the authentication information of the user, and sending a second identity authentication request to the server, where the second identity authentication request carries authentication information, so that the server performs identity authentication according to the authentication information.

It should be noted that, if the CAPTCHA includes authentication information and candidate information, in this case, the step of "displaying the CAPTCHA and the CAPTCHA input interface according to a preset policy" may include: displaying the candidate information at a random location on a preset graphics input interface, and displaying the authentication information on a preset authentication interface.

In this case, after the step of "displaying the CAPTCHA and the CAPTCHA input interface according to a preset policy", the method may further include: acquiring candidate information selected by the user from the preset graphics input interface, to obtain input information; and sending the input information to the server, so that the server matches the input information against the authentication information, to perform identity authentication. For details, refer to related description in Embodiment 7 to Embodiment 12. Details are not further described herein.

As can be seen, in this embodiment, a terminal may generate a security authentication request when a security authentication interface is triggered, then send the security authentication request to a server, so that the server checks, according to the security authentication request, whether a current operation is a machine attack, and delivers a CAPTCHA to the terminal only when the server determines that the current operation is a machine attack. The terminal generates a CAPTCHA input interface according to the CAPTCHA, and displays the CAPTCHA and the CAPTCHA input interface according to a preset policy. In the solution, security authentication can be performed on a current operation, and a CAPTCHA is delivered only when it is determined that the current operation is a machine attack. Therefore, compared with a solution in which CAPTCHA authentication needs to be performed in the existing technology, user operations can be greatly simplified, thereby improving processing efficiency of the security authentication. Moreover, the CAPTCHA is temporarily delivered and has flexible types, and moreover, is displayed only when security authentication fails. Therefore, it is difficult to perform cracking by using an automaton, and as compared with an existing solution, security of the solution can be greatly improved.

In addition, a user may select whether to trigger a security authentication operation. Therefore, compared with a solution in which a system background directly performs detection in the existing technology, implementation is more flexible, user operations become convenient, and moreover user experience can be greatly improved, thereby improving QoS.

Embodiment 3

The methods described according to Embodiment 1 and Embodiment 2 are further described below in detail by way of an example.

In this embodiment, an example in which an identity authentication apparatus is specifically integrated in a server and an identity authentication triggering apparatus is specifically integrated in a terminal is used to provide description.

The server may include a web server and a CAPTCHA server, and in addition, may further include a rule master server, a material storage server, and the like. The identity authentication triggering apparatus may be installed in the terminal in a form of a client or other software, for example, may be encapsulated in a form of an application programming interface (API). In this way, a provider of an accessed page only needs to add corresponding code to add this API. Detailed description is provided below.

Figure 3A:
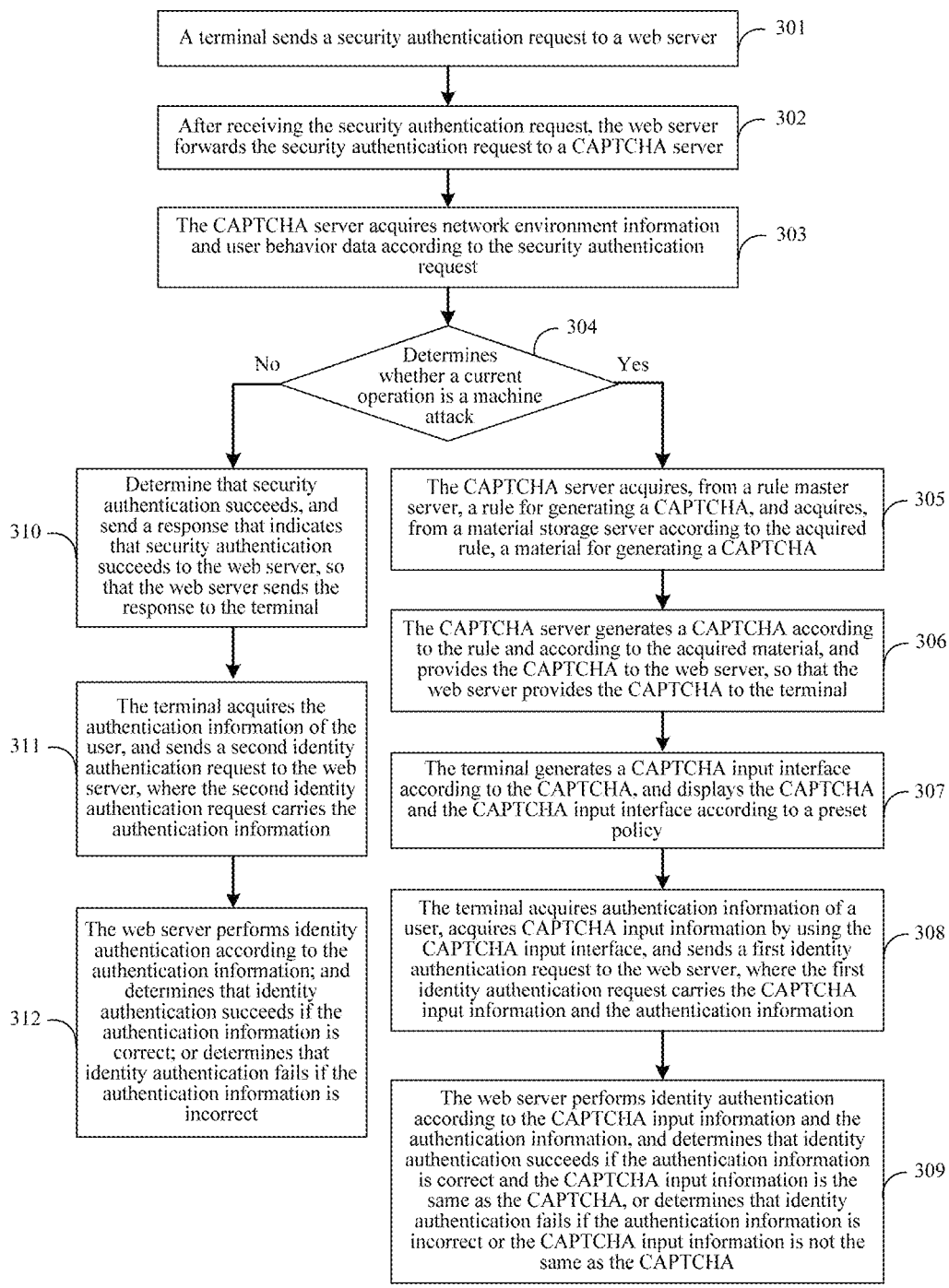
FIG. 3A is still another flowchart of an identity authentication method according to an embodiment of the present application.

As shown in FIG. 3A, a specific flowchart 300 of an identity authentication method may be as follows:

301: The terminal sends a security authentication request to the web server.

Figure 3B:
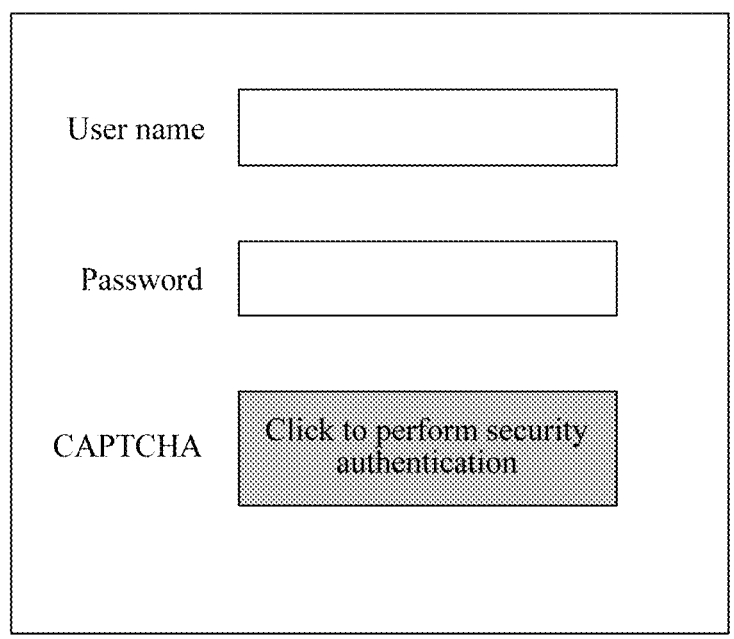
FIG. 3B is a schematic diagram of an interface before security authentication in an identity authentication method according to an embodiment of the present application.

For example, a security authentication instruction triggered when a user operates a security authentication trigger button on a corresponding page may be received, the security authentication request is then generated according to the security authentication instruction, and the security authentication request is sent to the web server. For example, referring to FIG. 3B, the user may click a trigger button "Click to perform security authentication" on an interface 320, to trigger generation of the security authentication request.

It should be noted that, a style and content of the interface 320 may be set according to a requirement of an actual application. Details are not further described herein.

302: After receiving the security authentication request, the web server forwards the security authentication request to the CAPTCHA server.

303: The CAPTCHA server acquires network environment information and user behavior data according to the security authentication request.

For example, a web page environment and a user behavior may be specifically monitored, to acquire the network environment information and the user behavior data.

The network environment information may include data such as a network behavior model parameter and a web page environment model parameter, and the user behavior data may include data such as a user behavior model parameter.

304: The CAPTCHA server determines, according to the network environment information and the user behavior data, whether a current operation is a machine attack; and performs step 305 if the current operation is a machine attack; or performs step 310 if the current operation is not a machine attack.

For example, the CAPTCHA server may retrieve a network behavior model parameter and a web page environment model parameter from the network environment information, and retrieve a user behavior model parameter from the user behavior data; then, perform analysis according to the network behavior model parameter, the web page environment model parameter, and the user behavior model parameter and according to a predetermined analysis model, and estimate, according to an analysis result, a probability that the current operation is a machine attack; and determine that the current operation is a machine attack if the probability is greater than a predetermined threshold, and perform step 305; or determine that the current operation is a non-machine attack if the probability is not greater than a predetermined threshold, and perform step 310.

305: When determining that the current operation is a machine attack, the CAPTCHA server acquires, from the rule master server, a rule for generating a CAPTCHA, and acquires, from the material storage server according to the acquired rule, a material for generating a CAPTCHA, that is, acquires various data required for generating a CAPTCHA. For example, a puzzle CAPTCHA needs data such as a puzzle image and location coordinates.

The rule master server may set different CAPTCHA difficulty levels for CAPTCHA scenarios used in services. When a scenario has a relatively high malicious degree, a more strict policy may be used. That is, a relatively difficult CAPTCHA type and relatively difficult interference are delivered. If a scenario only corresponds to an operation with a relatively low security risk, for example, registration, a relatively easy CAPTCHA may be delivered, or a service user directly designates a CAPTCHA type that the service user wants to use, where all parameters may be dynamically and flexibly configured, or interference processing on CAPTCHAs of various types may be enhanced. Alternatively, without designation, the rule master server may randomly deliver CAPTCHAs of different types.

The material storage server saves image materials, location information, and the like of CAPTCHAs of various types, for example, data such as locations, directions or angles needed to generate a puzzle CAPTCHA, and provides the data to the CAPTCHA server for use.

306: The CAPTCHA server generates a CAPTCHA according to the rule and according to the acquired material, and provides the CAPTCHA to the web server, so that the web server provides the CAPTCHA to a corresponding client in the terminal, for example, displays the CAPTCHA on a web page displayed by the client.

Optionally, to improve security, when the CAPTCHA is displayed, corresponding interference information may further be set for the CAPTCHA. For example, a particular background image may be set for the CAPTCHA, the CAPTCHA is particularly deformed, or the like. Details are not further described herein.

307: The terminal (that is, the client in the terminal) generates a CAPTCHA input interface according to the CAPTCHA, and displays the CAPTCHA and the CAPTCHA input interface according to a preset policy.

Figure 3C:
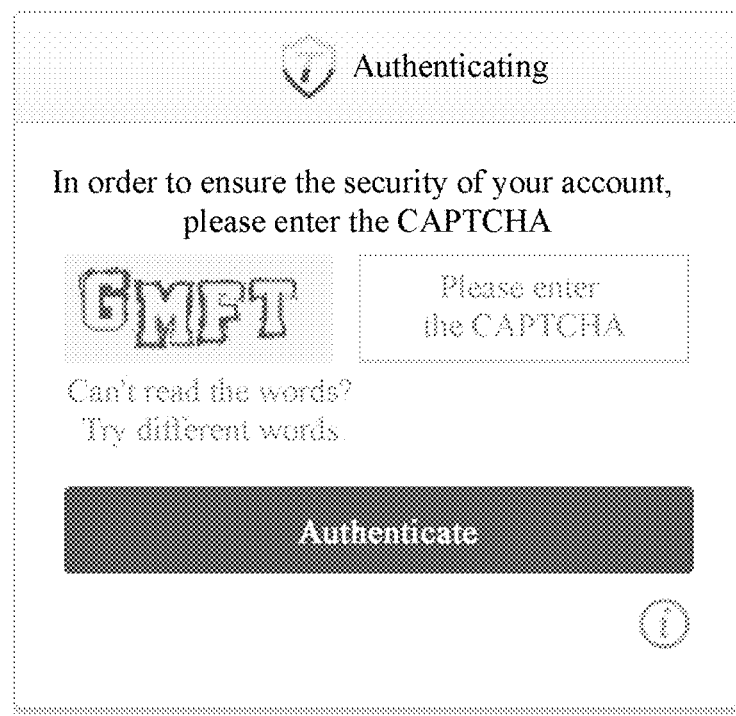
FIG. 3C is a schematic diagram of an interface that exists when security authentication fails in an identity authentication method according to an embodiment of the present application.

The preset policy may be set according to a requirement of an actual application, which may be, for example, as follows:

generating a pull-down box/side box according to the security authentication trigger button, dynamically opening the pull-down box/side box, and displaying the CAPTCHA and the CAPTCHA input interface in the opened pull-down box/side box. For example, refer to an interface 330 shown in FIG. 3C.

308: The terminal (that is, a client in the terminal) acquires authentication information of a user, acquires CAPTCHA input information by using the CAPTCHA input interface, and sends a first identity authentication request to the web server, where the first identity authentication request carries the CAPTCHA input information and the authentication information. Then, perform step 309.

309: After receiving the first identity authentication request, the web server performs identity authentication according to the CAPTCHA input information and the authentication information, and determines that identity authentication succeeds if the authentication information is correct and the CAPTCHA input information is the same as the CAPTCHA, where the procedure ends.

It is determined that identity authentication fails if the authentication information is incorrect or the CAPTCHA input information is not the same as the CAPTCHA.

A corresponding identity authentication result may be returned to the terminal. Details are not further described herein.

310: When determining that the current operation is a machine attack, the CAPTCHA server determines that security authentication succeeds, and sends a response that indicates that security authentication succeeds to the web server, so that the web server sends the response to the terminal.

311: After receiving the response that indicates that security authentication succeeds, the terminal may acquire the authentication information of the user, and send a second identity authentication request to the web server, where the second identity authentication request carries the authentication information.

Figure 3D:
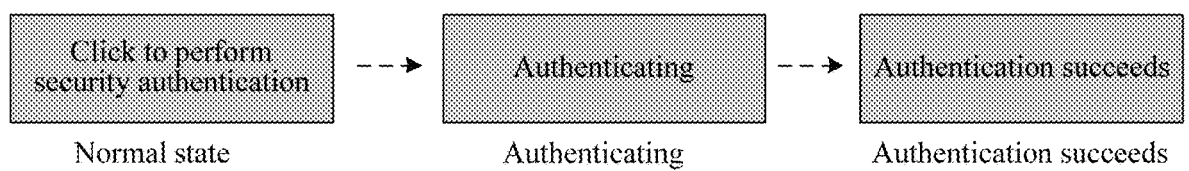
FIG. 3D is a schematic diagram of changes of a trigger button in an identity authentication method according to an embodiment of the present application.
Figure 3E:
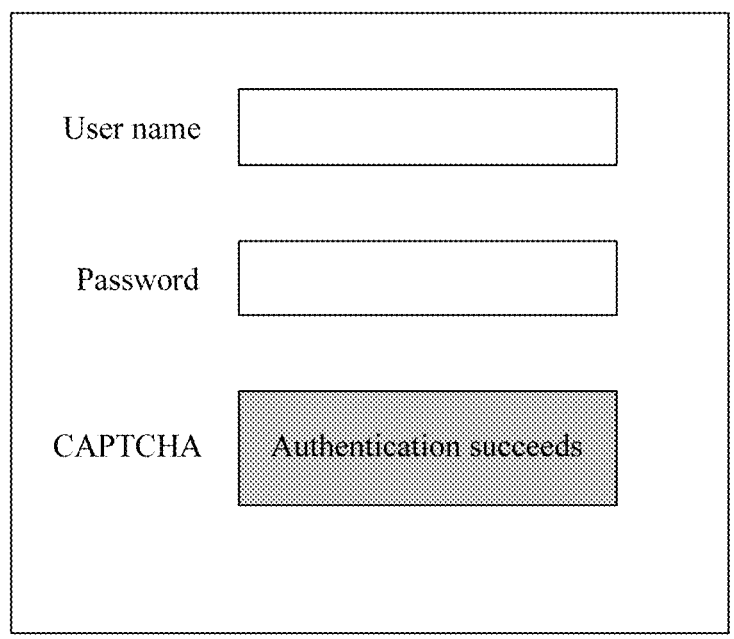
FIG. 3E is a schematic diagram of an interface that exists when security authentication succeeds in an identity authentication method according to an embodiment of the present application.

During security authentication, the style of a "Trigger button" of the security authentication may have corresponding dynamic changes. For example, during authentication, a text prompt on the "Trigger button" may change to "Authenticating". After receiving the response that indicates that security authentication succeeds, the terminal may change the text prompt on the "Trigger button" to "Authentication succeeds" or the like, referring to flowchart 340 shown in FIG. 3D. When security authentication succeeds, the interface 320 may change to the interface 350 shown in FIG. 3E.

Optionally, when a change of the status of the interface occurs, a corresponding animation may further be set during the change, making the interface more intuitive, beautiful, and interesting. For example, when the text prompt on the "Trigger button" is changing from "Authenticating" to "Authentication succeeds", a small animation may be played. For example, that is, the text prompt on the "Trigger button" changes from "Authenticating" to "Authentication succeeds" after the small animation. When the text prompt on the "Trigger button" is "Authenticating", an authentication progress may be displayed above or below "Authenticating", a small animation that may indicate that authentication is being performed is displayed, or the like. Details are not further described herein.

It should be noted that, a style and content of the interface may be determined according to a requirement of an actual application. Details are not further described herein.

312: After receiving the second identity authentication request, the web server performs identity authentication according to the authentication information; and determines that identity authentication succeeds if the authentication information is correct; or determines that identity authentication fails if the authentication information is incorrect, where the procedure ends.

As can be seen, in this embodiment, when a security authentication request sent by a terminal is received, network environment information and user behavior data are acquired according to the security authentication request. It is then determined, according to the network environment information and the user behavior data, whether a current operation is a machine attack. A CAPTCHA of a predetermined type is acquired according to a predetermined policy and the CAPTCHA is delivered to the terminal if the current operation is a machine attack. The terminal generates a CAPTCHA input interface according to the CAPTCHA and displays the CAPTCHA and the CAPTCHA input interface according to a preset policy, to perform identity authentication. It is determined that security authentication succeeds if the current operation is not a machine attack. In the solution, security authentication can be performed on a current operation, and a CAPTCHA is delivered only when it is determined that the current operation is a machine attack. Therefore, compared with a solution in which CAPTCHA authentication needs to be performed in all cases in the existing technology, user operations can be greatly simplified, thereby improving processing efficiency of authentication. Moreover, the CAPTCHA is temporarily delivered and has flexible types, and moreover, is displayed only when security authentication fails. Therefore, it is difficult to perform cracking by using an automaton, and as compared with an existing solution, security of the solution can be greatly improved.

In addition, a user may select whether to trigger a security authentication operation. Therefore, compared with a solution in which a system background directly performs detection in the existing technology, implementation is more flexible, user operations become convenient, and moreover user experience can be greatly improved, thereby improving QoS.

Embodiment 4

Figure 4:
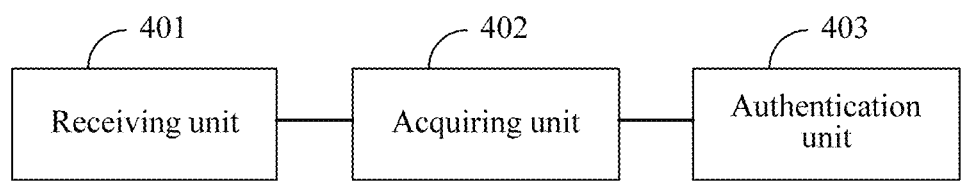
FIG. 4 is a schematic structural diagram of an identity authentication apparatus according to an embodiment of the present application.

To better implement the foregoing methods, this embodiment of the present application further provides an identity authentication apparatus. As shown in FIG. 4, the identity authentication apparatus 400 includes a receiving unit 401, an acquiring unit 402, and an authentication unit 403 as follows:

(1) Receiving Unit 401

The receiving unit 401 is configured to receive a security authentication request sent by a terminal.

(2) Acquiring Unit 402

The acquiring unit 402 is configured to acquire network environment information and user behavior data according to the security authentication request.

For example, the acquiring unit 402 may specifically monitor a web page environment and a user behavior, to acquire the network environment information and the user behavior data.

The network environment information may include data such as a network behavior model parameter and a web page environment model parameter, and the user behavior data may include data such as a user behavior model parameter.

(3) Authentication Unit 403

The authentication unit 403 is configured to: determine, according to the network environment information and the user behavior data, whether a current operation is a machine attack; and acquire a CAPTCHA of a predetermined type according to a predetermined policy and deliver the CAPTCHA to the terminal if the current operation is a machine attack, to perform identity authentication; or determine that security authentication succeeds if the current operation is not a machine attack.

For example, the authentication unit 403 may be specifically configured to: retrieve a network behavior model parameter and a web page environment model parameter from the network environment information, and retrieve a user behavior model parameter from the user behavior data; then, perform analysis according to the network behavior model parameter, the web page environment model parameter, and the user behavior model parameter and according to a predetermined analysis model, and determine, according to an analysis result, whether the current operation is a machine attack; and acquire a CAPTCHA of a predetermined type according to the predetermined policy and deliver the CAPTCHA to the terminal if the current operation is a machine attack, to perform identity authentication; or determine that security authentication succeeds if the current operation is not a machine attack.

A policy for generating a CAPTCHA may be set according to a requirement of an actual application, for example, may be set as follows:

The authentication unit 403 may be specifically configured to: evaluate a possibility that the current operation is a machine attack when it is determined, according to the network environment information and the user behavior data, that the current operation is a machine attack, and acquire a CAPTCHA of a corresponding type according to an evaluation result.

Alternatively, the authentication unit 403 may be specifically configured to randomly select a CAPTCHA of a type from CAPTCHAs of different types when it is determined, according to the network environment information and the user behavior data, that the current operation is a machine attack.

For example, several levels may be set according to a value (for example, a malicious degree of a current environment) of a probability of a machine attack. When a probability that the operation is determined to be a machine attack is higher, a level is higher, and a CAPTCHA with higher security such as a puzzle CAPTCHA may be used. In contrast, when a probability that the operation is determined as a machine attack is lower, a level is lower, and a relatively simple CAPTCHA with lower security such as a conventional character CAPTCHA may be used.

Alternatively, the authentication unit 403 may be specifically configured to: acquire a service identifier corresponding to the current operation when it is determined, according to the network environment information and the user behavior data, that the current operation is a machine attack, and acquire a CAPTCHA of a corresponding type according to the service identifier.

For example, different CAPTCHA generation policies may be set for different services according to requirements of actual applications. For example, for a service such as payment that has relatively high security requirement, a relatively complex CAPTCHA with relatively high security such as a puzzle CAPTCHA needs to be provided. In contrast, for an ordinary service such as web page browsing, only a CAPTCHA with relatively low security such as a conventional character CAPTCHA may be provided.

Certainly, other predetermined policies may further be used, and are no longer enumerated herein.

Optionally, after it is determined that security authentication succeeds, a response that indicates that security authentication succeeds may further be returned to the terminal, that is:

The authentication unit 403 may further be configured to return a response that indicates that security authentication succeeds to the terminal after it is determined that security authentication succeeds, so that the terminal switches, according to the response, a display status of a current page to a second state, where the second state indicates that security authentication succeeds.

Optionally, to make it easy for a user to know a current state, when performing authentication, a server may further return corresponding prompt information to the terminal, to indicate that authentication is being performed, that is:

The authentication unit 403 may further be configured to: when it is being determined, according to the network environment information and the user behavior data, whether the current operation is a machine attack, send prompt information that indicates that authentication is being performed to the terminal, so that the terminal switches, according to the prompt information, a display status of a current page to a first state, where the first state indicates that security authentication is being performed.

Optionally, after the CAPTCHA is delivered to the terminal, a first identity authentication request sent by the terminal may further be received. The first identity authentication request may carry information such as CAPTCHA input information and authentication information of a user. Identity authentication is then performed according to the first identity authentication request. That is:

The receiving unit 401 may further be configured to receive the first identity authentication request sent by the terminal, where the first identity authentication request carries the CAPTCHA input information and the authentication information of the user.

The authentication unit 403 may further be configured to: perform identity authentication according to the CAPTCHA input information and the authentication information of the user; and determine that identity authentication succeeds if the authentication information is correct and the CAPTCHA input information is the same as the CAPTCHA; or determine that identity authentication fails if the authentication information is incorrect or the CAPTCHA input information is not the same as the CAPTCHA.

Similarly, after security authentication succeeds, a second identity authentication request sent by the terminal may be received. The second identity authentication request carries authentication information of the user (but does not need to carry the CAPTCHA). Then, identity authentication is performed according to the second identity authentication request. That is:

The receiving unit 401 may further be configured to receive the second identity authentication request sent by the terminal, where the second identity authentication request carries the authentication information of the user.

The authentication unit 403 may further be configured to: perform identity authentication according to the authentication information; and determine that identity authentication succeeds if the authentication information is correct; or determine that identity authentication fails if the authentication information is incorrect.

Optionally, the identity authentication apparatus 400 may further include an identity authentication sub-apparatus. For details of the identity authentication sub-apparatus, refer to Embodiment 10, Details are not further described herein.

During specific implementation, the foregoing units may be implemented as independent entities, or may be arbitrarily combined and implemented as a same entity or several entities. For specific implementation of the foregoing units, refer to the foregoing method embodiments. Details are not further described herein.

The identity authentication apparatus 400 may be specifically integrated in a network device such as a server. The server may be one independent entity, or may include multiple entities.

As can be seen, according to the identity authentication apparatus 400 in this embodiment, when a security authentication request sent by a terminal is received, the acquiring unit 402 acquires network environment information and user behavior data according to the security authentication request. The authentication unit 403 then determines, according to the network environment information and the user behavior data, whether a current operation is a machine attack; and acquires a CAPTCHA of a predetermined type according to a predetermined policy and delivers the CAPTCHA to the terminal if the current operation is a machine attack, to perform identity authentication; or determines that security authentication succeeds if the current operation is not a machine attack. In the solution, security authentication can be performed on a current operation, and a CAPTCHA is delivered only when it is determined that the current operation is a machine attack. Therefore, compared with a solution in which CAPTCHA authentication needs to be performed in all cases in the existing technology, user operations can be greatly simplified, thereby improving processing efficiency of authentication. Moreover, the CAPTCHA is temporarily delivered and has flexible types. Therefore, it is difficult to perform cracking by using an automaton, and as compared with an existing solution, security of the solution can be greatly improved.

In addition, a user may select whether to trigger a security authentication operation. Therefore, compared with a solution in which a system background directly performs detection in the existing technology, implementation is more flexible, user operations become convenient, and moreover user experience can be greatly improved, thereby improving QoS.

Embodiment 5

Figure 5:
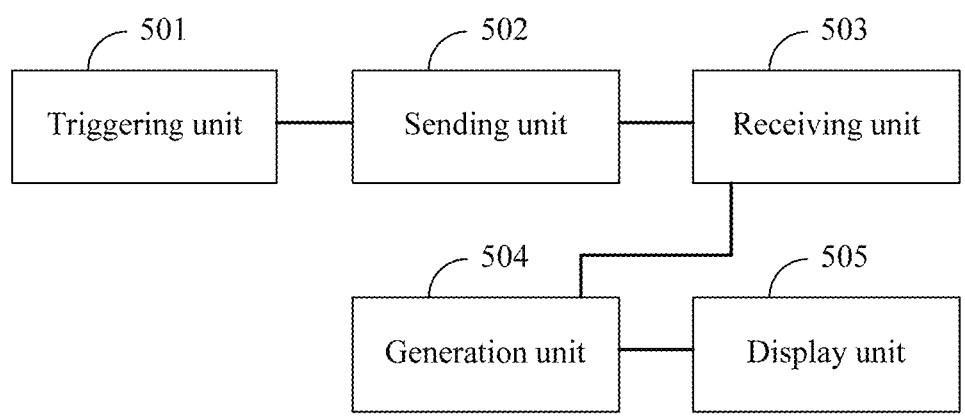
FIG. 5 is a schematic structural diagram of an identity authentication triggering apparatus according to an embodiment of the present application.

Correspondingly, this embodiment of the present application further provides an identity authentication triggering apparatus. As shown in FIG. 5, the identity authentication triggering apparatus 500 may include a triggering unit 501, a sending unit 502, a receiving unit 503, a generation unit 504, and a display unit 505 as follows:

(1) Triggering Unit 501

The triggering unit 501 is configured to generate a security authentication request when a security authentication interface is triggered.

The security authentication interface may be indicated in various types, and may be, for example, an entry box or a list box of an instruction or a security authentication trigger button. The security authentication trigger button may be a button, or may be a slider or the like. Details are not further described herein.

If the security authentication interface is the security authentication trigger button:

The triggering unit 501 may be specifically configured to: receive a security authentication instruction triggered when a user operates the security authentication trigger button, and generate the security authentication request according to the security authentication instruction.

The user may operate the security authentication trigger button in various manners. For example, the user may perform a click, a slide, a touch or the like.

(2) Sending Unit 502

The sending unit 502 is configured to send the security authentication request to a server, so that the server checks, according to the security authentication request, whether a current operation is a machine attack.

(3) Receiving Unit 503

The receiving unit 503 is configured to receive a CAPTCHA returned by the server when the server determines that the current operation is a machine attack.

A form of the CAPTCHA is not limited. Various types of CAPTCHAs may be used. For example, the CAPTCHA may be a puzzle CAPTCHA, an image CAPTCHA or a character CAPTCHA.

(4) Generation Unit 504

The generation unit 504 is configured to generate a CAPTCHA input interface according to the CAPTCHA.

(5) Display Unit 505

The display unit 505 is configured to display the CAPTCHA and the CAPTCHA input interface according to a preset policy.

The preset policy may be set according to a requirement of an actual application, which may be, for example, as follows:

The display unit 505 may be specifically configured to: generate a pull-down box/side box according to the security authentication trigger button, and display the CAPTCHA and the CAPTCHA input interface in the pull-down box/side box.

A form of displaying the CAPTCHA and the CAPTCHA input interface may depend on a requirement of an actual application. For example, the CAPTCHA input interface may be set to be an entry box or the like.

Optionally, after the displaying the CAPTCHA and the CAPTCHA input interface according to a preset policy, the user may further input corresponding CAPTCHA input information in the CAPTCHA input interface according to the displayed CAPTCHA. For example, if the CAPTCHA is "12ab", the user may input "12ab" in the CAPTCHA input interface. Then, the identity authentication triggering apparatus 500 sends a first identity authentication request to the server, and adds the CAPTCHA input information and authentication information to the first identity authentication request, so that the server performs identity authentication according to the CAPTCHA input information and the authentication information. That is, the identity authentication triggering apparatus 500 may further include an acquiring unit as follows:

The acquiring unit is configured to: acquire the authentication information of the user, and acquire the CAPTCHA input information by using the CAPTCHA input interface.

In this case, the sending unit 502 may further be configured to send the first identity authentication request to the server, where the first identity authentication request carries the CAPTCHA input information and the authentication information, so that the server performs identity authentication according to the CAPTCHA input information and the authentication information.

Subsequently, the receiving unit 503 may further receive a response that is returned by the server and is about an identity authentication result, for example, that identity authentication succeeds or that identity authentication fails. Then the display unit 505 displays the identity authentication result. When identity authentication fails, the display unit 505 may further prompt, to the user, a corresponding failure cause, for example, an authentication information error or a CAPTCHA error.

The authentication information refers to information, other than a CAPTCHA, used for identity authentication. For example, the authentication information may include a user account and a password or may further include other information such as a user name.

In addition, it should be noted that, the identity authentication triggering apparatus 500 may further receive a response that is returned by the server when the server determines that the current operation is a non-machine attack and indicates that security authentication succeeds, generate security-authentication success prompt information according to the response that indicates that security authentication succeeds, and display the security-authentication success prompt information, for example, display words "Security authentication succeeds" or the like.

The receiving unit 503 may further be configured to receive a response that is returned by the server when the server determines that the current operation is a non-machine attack and indicates that security authentication succeeds.

In this case, the display unit 505 may further be configured to switch, according to the response, a display status of a current page to a second state, where the second state indicates that security authentication succeeds.

For example, the display unit 505 may be specifically configured to: generate security-authentication success prompt information according to the response that indicates that security authentication succeeds, and display the security-authentication success prompt information. For example, in this case, words "Authentication succeeds" and the like may be displayed on the current page or at a preset location of the security authentication trigger button.

Optionally, after the security authentication request is sent to the server, to make it easy for a user to know a current state, prompt information that is sent by the server and indicates that authentication is being performed may further be received, and the user is prompted, according to the prompt information, that authentication is being performed, that is:

The receiving unit 503 may further be configured to receive prompt information that is sent by the server and indicates that authentication is being performed.

In this case, the display unit 505 may further be configured to switch, according to the prompt information, a display status of a current page to a first state, where the first state indicates that security authentication is being performed.

For example, in this case, the display unit 505 may display a word "Authenticating" or the like on the current page or at the preset location of the security authentication trigger button.

Optionally, the identity authentication triggering apparatus 500 may further include an identity authentication trigger sub-apparatus. For details of the identity authentication sub-apparatus, refer to Embodiment 11. Details are not further described herein.

During specific implementation, the foregoing units may be implemented as independent entities, or may be arbitrarily combined and implemented as a same entity or several entities. For specific implementation of the foregoing units, refer to the foregoing method embodiments. Details are not further described herein.

The identity authentication triggering apparatus 500 may be specifically integrated in a network device such as a terminal, for example, is installed in the terminal in a form of a client or software. The terminal may be specifically a device such as a mobile phone, a tablet computer or a PC.

As can be seen, according to the identity authentication triggering apparatus 500 in this embodiment, the triggering unit 501 may generate a security authentication request when a security authentication interface is triggered, then send the security authentication request to a server, so that the server checks, according to the security authentication request, whether a current operation is a machine attack, and delivers a CAPTCHA to a terminal only when the server determines that the current operation is a machine attack. The generation unit 504 of the terminal generates a CAPTCHA input interface according to the CAPTCHA, and the display unit 505 displays the CAPTCHA and the CAPTCHA input interface according to a preset policy. In the solution, security authentication can be performed on a current operation, and a CAPTCHA is delivered only when it is determined that the current operation is a machine attack. Therefore, compared with a solution in which CAPTCHA authentication needs to be performed in all cases in the existing technology, user operations can be greatly simplified, thereby improving processing efficiency of authentication. Moreover, the CAPTCHA is temporarily delivered and has flexible types, and moreover, is displayed only when security authentication fails. Therefore, it is difficult to perform cracking by using an automaton, and as compared with an existing solution, security of the solution can be greatly improved.

In addition, a user may select whether to trigger a security authentication operation. Therefore, compared with a solution in which a system background directly performs detection in the existing technology, implementation is more flexible, user operations become convenient, and moreover user experience can be greatly improved, thereby improving QoS.

Embodiment 6

In addition, an embodiment of the present application further provides an identity authentication system. The identity authentication system may include any identity authentication apparatus and any identity authentication triggering apparatus provided in the embodiments of the present application. For details, refer to Embodiment 4 and Embodiment 5. For example, the identity authentication system may be as follows:

The identity authentication triggering apparatus is configured to: send a security authentication request to a server, so that the server checks, according to the security authentication request, whether a current operation is a machine attack; receive a CAPTCHA returned by the server when the server determines that the current operation is a machine attack; generate a CAPTCHA input interface according to the CAPTCHA; and display the CAPTCHA and the CAPTCHA input interface according to a preset policy.

The identity authentication apparatus is configured to: receive a security authentication request sent by a terminal; acquire network environment information and user behavior data according to the security authentication request; determine, according to the network environment information and the user behavior data, whether a current operation is a machine attack; and acquire a CAPTCHA of a predetermined type according to a predetermined policy and deliver the CAPTCHA to the terminal if the current operation is a machine attack, to perform identity authentication; or determine that security authentication succeeds if the current operation is not a machine attack.

The identity authentication triggering apparatus may be integrated in the terminal in a form of a client or other software. The identity authentication apparatus may be integrated in a network device such as a server. Details are not further described herein.

For specific implementation of the foregoing devices, refer to the foregoing embodiments. Details are not further described herein.

In addition, the identity authentication system may further include another device, for example, a gateway or another server, for example, a server for storing the user behavior data and a server for storing data of a web page environment. Details are not further described herein.

The identity authentication system may include any identity authentication apparatus and any identity authentication triggering apparatus provided in the embodiments of the present application. Therefore, beneficial effects that can be achieved by any identity authentication apparatus and any identity authentication triggering apparatus provided in the embodiments of the present application can be achieved. For details, refer to the foregoing embodiments. Details are not further described herein.

Embodiment 7

This embodiment is described from the perspective of an identity authentication apparatus. The identity authentication apparatus may be specifically integrated in a terminal, a server or another device that needs to perform identity authentication.

An identity authentication method includes: receiving a third identity authentication request of a user; generating authentication information and candidate information according to the third identity authentication request, where the authentication information and the candidate information have a predetermined correspondence; displaying the candidate information at a random location on a preset graphics input interface, and displaying the authentication information on a preset authentication interface; acquiring candidate information selected by the user from the preset graphics input interface, to obtain input information; determining whether the input information matches the authentication information; and determining that identity authentication succeeds if the input information matches the authentication information; or rejecting the third identity authentication request if the input information does not match the authentication information.

Figure 6:
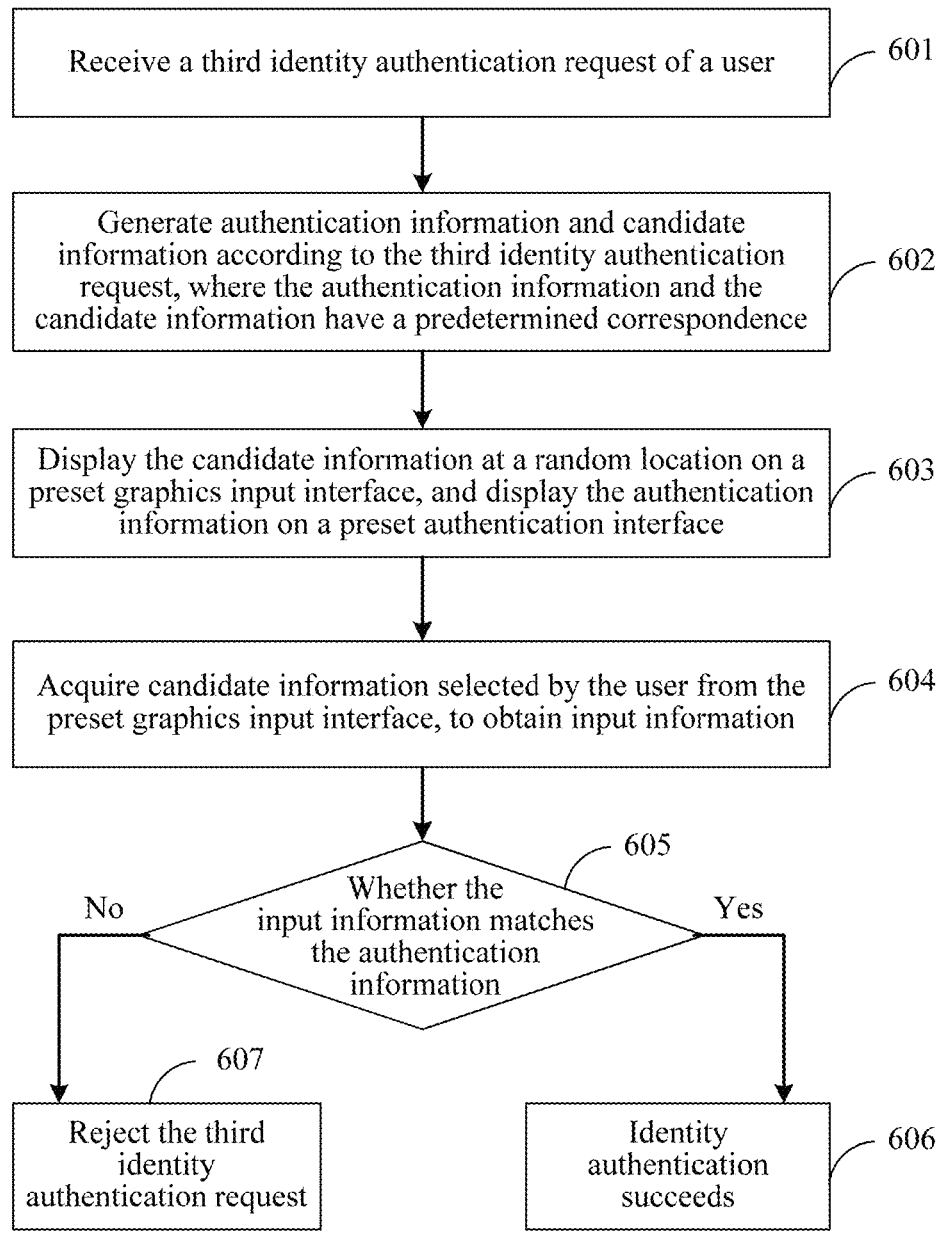
FIG. 6 is a flowchart of an identity authentication method according to an embodiment of the present application.

As shown in FIG. 6, a specific flowchart 600 of the identity authentication may be as follows:

601: Receive a third identity authentication request of a user.

An example in which the identity authentication apparatus is integrated in the terminal is used. The terminal may specifically receive the third identity authentication request sent when the user triggers an identity authentication trigger button. For example, the user may click or slide a trigger button such as "Log in", "Acquire CAPTCHA", "Unlock" or "Authenticate" to trigger the third identity authentication request.

For another example, if the identity authentication apparatus is integrated in a network side device such as a server, in this case, the third identity authentication request sent by the terminal (or the client) may be specifically received. The third identity authentication request may be sent when the user triggers the identity authentication trigger button. Details are not further described herein.

602: Generate authentication information and candidate information according to the third identity authentication request, where the authentication information and the candidate information have a predetermined correspondence.

The predetermined correspondence may be set according to a requirement of an actual application. For example, the authentication information may be set to be a subset of the candidate information, that is, the authentication information is a part of content of the candidate information. Alternatively, the authentication information may be set to be an operation on the candidate information, that is, the step of "generating authentication information and candidate information according to the third identity authentication request, where the authentication information and the candidate information have a predetermined correspondence" may specifically use any manner in the following:

(1) First Manner

Generate the authentication information according to the third identity authentication request, and generate the candidate information based on the authentication information, to enable the authentication information to be a subset of the candidate information.

Various manners may be used to generate the candidate information based on the authentication information. For example, content of the authentication information may be randomly arranged, and randomly generated content is added to the randomly arranged content, to obtain the candidate information.

When randomly generated content is added, the randomly generated content may be randomly inserted in content that is obtained after random arrangement. The randomly generated content may be inserted either according to a particular rule or in a random order. Details are not further described herein.

For example, if the authentication information generated according to the third identity authentication request is four groups of characters "AT TO HI HOW". The four groups of characters may be randomly arranged, and randomly generated content such as "NET", "A", "SUN", and "WAY" is added, so as to obtain the candidate information, which specifically includes "AT", "SUN", "HI", "TO", "WAY", "A", and "HOW", and the like.

(2) Second Manner

Generate the candidate information according to the third identity authentication request, and determine the authentication information according to the candidate information, to enable the authentication information to be a subset of the candidate information;

Various manners may be used to determine the authentication information according to the candidate information. For example, a preset quantity of content may be randomly extracted from the candidate information, and the extracted content is arranged, to obtain the authentication information.

The preset quantity may be set according to a requirement of an actual application.

For example, if the candidate information generated according to the third identity authentication request includes "AT", "SUN", "HI", "TO", "WAY", "A", and "HOW", a preset quantity of content may be randomly extracted from the candidate information. For example, four groups of characters "AT", "HI", "TO", and "HOW" are extracted. The extracted content is then arranged according to a particular rule or arranged randomly. For example, after arrangement, "AT", "TO", "HI", and "HOW" are obtained. The authentication information is specifically "AT TO HI HOW", and the like.

(3) Third Manner

Generate the candidate information according to the third identity authentication request, select operation target information from the candidate information, determine corresponding operation content according to the operation target information, and generate the authentication information according to the operation content.

The operation content may be set according to a requirement of an actual application. For example, the user may be required to input a part of information of the candidate information. If the candidate information is multiple articles displayed at random locations on a background picture, in this case, the user may be required to click an article or a type of articles on the picture to perform authentication, or, the user may further be required to perform another operation on the candidate information. For example, if the candidate information is several people with an umbrella and without an umbrella on a background picture, in this case, the user may be required to move a held umbrella into the hand of a person without an umbrella on the background picture. Examples are no longer enumerated herein.

It should be noted that, the candidate information and the authentication information in this embodiment of the present application may be characters, for example, digits, Chinese text or English letters, or may be images.

603: Display the candidate information at a random location on a preset graphics input interface, and display the authentication information on a preset authentication interface.

The graphics input interface includes multiple input interfaces. Corresponding input information may be acquired by selecting, for example, clicking or sliding content on the graphics input interface. Forms, content, and sizes of both the preset graphics input interface and the preset authentication interface may be set according to a requirement of an actual application. Details are not further described herein.

An example in which the identity authentication apparatus is integrated in the terminal is used. In this case, the candidate information may be directly displayed at a random location on the preset graphics input interface on a screen of the terminal, and the authentication information may be displayed on a preset authentication interface.

For another example, the identity authentication apparatus is integrated in a network device, for example, a server. In this case, the candidate information may be displayed at a random location on the preset graphics input interface (or referred to as an input area or an input interface) on a corresponding page, and the authentication information is displayed on the preset authentication interface (or referred to as an authentication area or an authentication interface) on the corresponding page. Then the corresponding page is sent to the terminal, and the page is displayed on the screen of the terminal.

Optionally, to make user operations convenient, when the authentication information is displayed, prompt information may further be generated, to prompt operations that the user specifically needs to perform. An example in which the authentication information is a subset of the candidate information is used. In this case, the user may be prompted to select corresponding candidate information on the preset graphics input interface as the input information according to the displayed authentication information, for example, to select a corresponding character or to click a corresponding location on an image.

Optionally, to improve security, when the candidate information and the authentication information are displayed, some interference information may further be added. Characters are used as an example. In this case, the characters may be deformed. Alternatively, some background pictures or the like may be added to the characters. That is, optionally, particular background images may be set for both the preset graphics input interface and the preset authentication interface. The background images may be flexibly set. That is, the identity authentication method may further include:

receiving a first setting request of the user, where the first setting request indicates a background image that needs to be used, and replacing a background of the graphics input interface with the background image according to the first setting request.

Alternatively, a second setting request of the user is received, where the second setting request indicates a background image that needs to be used, and a background of the authentication interface is replaced with the background image according to the second setting request.

604: Acquire candidate information selected by the user from the preset graphics input interface, to obtain input information.

For example, the candidate information selected by the user from the preset graphics input interface may be specifically acquired, and the candidate information selected by the user is arranged according to a selection order of the user, to obtain the input information.

605: Determine whether the input information matches the authentication information; and perform step 606 if the input information matches the authentication information; or perform step 607 if the input information does not match the authentication information.

An example in which the authentication information is a subset of the candidate information is used. In this case, it may be specifically determined whether the input information is the same as the authentication information. It is determined that the input information matches the authentication information if the input information is the same as the authentication information, and perform step 606. It is determined that the input information does not match the authentication information if the input information is not the same as the authentication information, and perform step 607.

Another example in which the authentication information is a particular operation on the candidate information is used. In this case, it may be specifically determined whether the input information meets corresponding operation content. It is determined that the input information matches the authentication information if the input information meets the corresponding operation content, and perform step 606. It is determined that the input information does not match the authentication information if the input information does not meet the corresponding operation content, and perform step 607.

606: Determine that identity authentication succeeds when it is determined that the input information matches the authentication information.

Optionally, the third identity authentication request may further carry the authentication information. In this case, it may further be determined whether the authentication information is correct after it is determined that the input information matches the authentication information. The step of determining that identity authentication succeeds is performed only if the authentication information is correct. Identity authentication fails if the authentication information is incorrect, and in this case, the third identity authentication request may be rejected.

The authentication information refers to information, other than a CAPTCHA, used for identity authentication. For example, the authentication information may include a user account and a password or may further include other information such as a user name.

607: When it is determined that the input information does not match the authentication information, reject the third identity authentication request.

Optionally, when the third identity authentication request is rejected, a cause why identity authentication fails, for example, an authentication information error or a CAPTCHA error, may further be prompted. Details are not further described herein.

As can be seen, according to this embodiment, authentication information and candidate information are generated according to a third identity authentication request of a user when the third identity authentication request is received. The candidate information is displayed at a random location on a preset graphics input interface, and the authentication information is displayed on a preset authentication interface. The authentication information and the candidate information have a predetermined correspondence. Candidate information selected by the user from the preset graphics input interface is then acquired, to obtain input information. The input information is matched against the authentication information. It is determined that identity authentication succeeds if the input information matches the authentication information. The third identity authentication request is rejected if the input information does not match the authentication information. Therefore, an objective of performing identity authentication on the user is achieved. In the solution, candidate information that can be selected by a user may be displayed at a random location on a preset graphics input interface. Therefore, it is very difficult for an intruder to find a fixed location to perform cracking, so that cracking difficulty is greatly increased. Moreover, in addition to the candidate information that can be displayed at a random location on the preset graphics input interface, authentication information in this embodiment of the present application also needs to be displayed on the preset authentication interface. Therefore, an intruder not only needs to crack the candidate information, but also needs to crack the authentication information on the authentication interface, so that cracking complexity is greatly increased. Therefore, as compared with the existing technology, higher security is achieved.

Embodiment 8

If an identity authentication apparatus in Embodiment 8 is integrated in a server, a terminal may be specifically used to display candidate information and authentication information. That is, this embodiment of the present application may further provide another identity authentication method. The identity authentication method is described below.

This embodiment is described from the perspective of an identity authentication triggering apparatus. The identity authentication triggering apparatus may be integrated in the terminal, for example, installed in the terminal in a form of a client or other software.

The identity authentication method includes: sending a third identity authentication request to the server; receiving authentication information and candidate information that are returned by the server according to the third identity authentication request; displaying the candidate information at a random location on a preset graphics input interface, and displaying the authentication information on a preset authentication interface; acquiring candidate information selected by a user from the preset graphics input interface, to obtain input information; and sending the input information to the server, so that the server matches the input information against the authentication information, to perform identity authentication.

Figure 7:
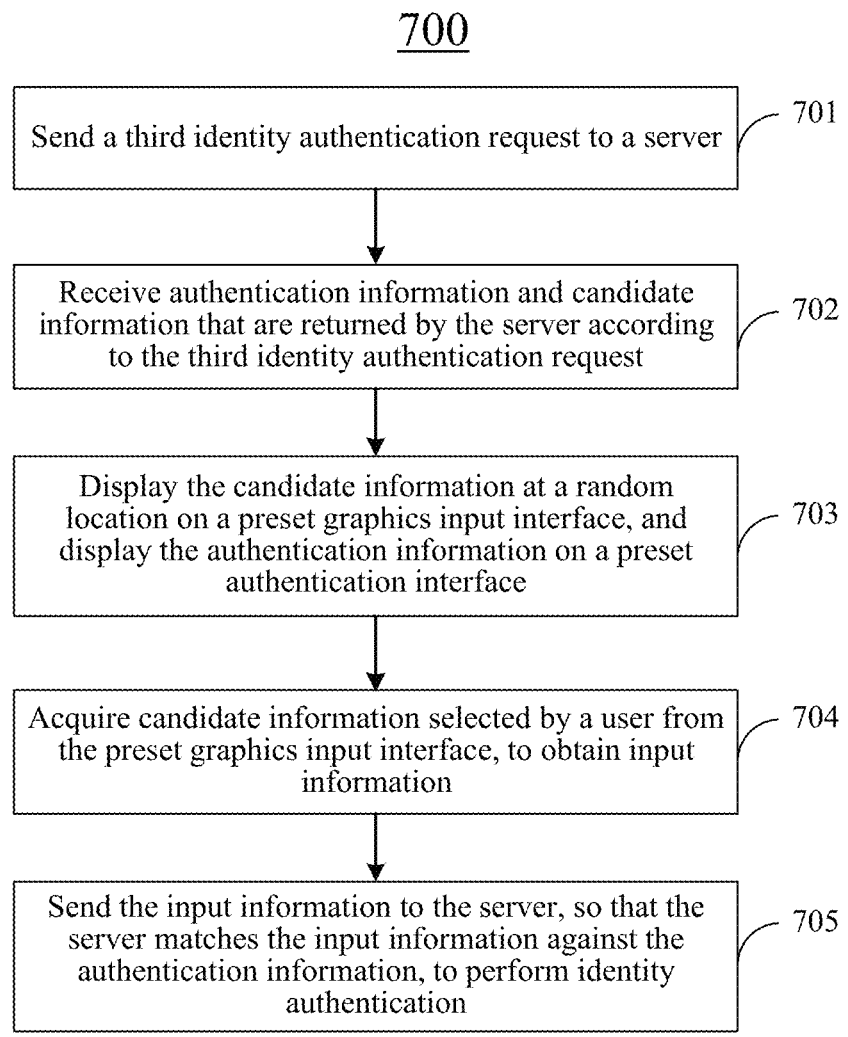
FIG. 7 is another flowchart of an identity authentication method according to an embodiment of the present application.

As shown in FIG. 7, a specific flowchart 700 of the identity authentication method may be as follows:

701: Send a third identity authentication request to the server.

For example, a third identity authentication request triggered by a user may be received. For example, the user may click or slide a trigger button such as "Log in", "Acquire CAPTCHA", "Unlock" or "Authenticate" to trigger the third identity authentication request. Then the third identity authentication request is sent to the server.

702: Receive authentication information and candidate information that are returned by the server according to the third identity authentication request.

For details of a method for generating, by the server, the authentication information and the candidate information according to the third identity authentication request, refer to Embodiment 7. Details are not further described herein.

The authentication information and the candidate information have a predetermined correspondence. The predetermined correspondence may be set according to a requirement of an actual application. For example, the authentication information may be set to be a subset of the candidate information. That is, the authentication information is a part of content of the candidate information. Alternatively, the authentication information may be set to be an operation on the candidate information, and the like.

703: Display the candidate information at a random location on a preset graphics input interface, and display the authentication information on a preset authentication interface.

The graphics input interface includes multiple input interfaces. Corresponding input information may be acquired by selecting, for example, clicking or sliding content on the graphics input interface. Forms, content, and sizes of both the preset graphics input interface and the preset authentication interface may be set according to a requirement of an actual application. Details are not further described herein.

Optionally, to make user operations convenient, when the authentication information is displayed, prompt information may further be generated, to prompt operations that the user specifically needs to perform. An example in which the authentication information is a subset of the candidate information is used. In this case, the user may be prompted to select corresponding candidate information on the preset graphics input interface as the input information according to the displayed authentication information, for example, to select a corresponding character or to click a corresponding location on an image. That is, the step of "when the authentication information is displayed", the identity authentication method may further include:

generating prompt information, where the prompt information instructs the user to select corresponding candidate information on the preset graphics input interface as the input information according to the displayed authentication information.

Optionally, to improve security, when the candidate information and the authentication information are displayed, some interference information may further be added. Characters are used as an example. In this case, the characters may be deformed. Alternatively, some background pictures or the like may be added to the characters. That is, optionally, particular background images may be set for both the preset graphics input interface and the preset authentication interface. The background images may be flexibly set. That is, the identity authentication method may further include:

receiving a third setting request of the user, where the third setting request indicates a background image that needs to be used, and replacing a background of the graphics input interface with the background image according to the third setting request; or receiving a fourth setting request of the user, where the fourth setting request indicates a background image that needs to be used, and replacing a background of the authentication interface with the background image according to the fourth setting request.

704: Acquire candidate information selected by a user from the preset graphics input interface, to obtain input information.

For example, the candidate information selected by the user from the preset graphics input interface may be specifically acquired, and the candidate information selected by the user is arranged according to a selection order of the user, to obtain the input information.

705: Send the input information to the server, so that the server matches the input information against the authentication information, to perform identity authentication.

The server may determine whether the input information matches the authentication information. The server determines that identity authentication succeeds, and sends a corresponding response message that indicates that authentication succeeds to the terminal. After receiving the response message that indicates that authentication succeeds, the terminal may generate corresponding prompt information, to prompt the user that authentication succeeds.

The server determines that identity authentication fails if the input information does not match the authentication information, and rejects the third identity authentication request. For example, the server may send a corresponding response message that indicates that authentication fails to the terminal. After receiving the response message that indicates that authentication fails, the terminal may generate corresponding prompt information, to prompt the user that authentication fails. Optionally, a cause why identity authentication fails, for example, an authentication information error or a CAPTCHA error, may further be prompted. Details are not further described herein.

For a specific method for matching, by the server, the input information against the authentication information, refer to Embodiment 7. Details are not further described herein.

As can be seen, according to this embodiment, a third identity authentication request is sent to a server. Authentication information and candidate information that are returned by the server according to the third identity authentication request are then received. The candidate information is displayed at a random location on a preset graphics input interface, and the authentication information is displayed on a preset authentication interface. The authentication information and the candidate information have a predetermined correspondence. Candidate information selected by a user from the preset graphics input interface is then acquired, to obtain input information. The input information is provided to the server to perform identity authentication. In the solution, candidate information that can be selected by a user may be displayed at a random location on a preset graphics input interface. Therefore, it is very difficult for an intruder to find a fixed location to perform cracking, so that cracking difficulty is greatly increased. Moreover, in addition to the candidate information that can be displayed at a random location on the preset graphics input interface, authentication information in this embodiment of the present application also needs to be displayed on the preset authentication interface. Therefore, an intruder not only needs to crack the candidate information, but also needs to crack the authentication information on the authentication interface, so that cracking complexity is greatly increased. Therefore, as compared with the existing technology, higher security is achieved.

Embodiment 9

The methods described according to Embodiment 7 and Embodiment 8 are further described below in detail by way of an example.

In this embodiment, an example in which an identity authentication apparatus is specifically integrated in a server and authentication information is a subset of candidate information is used to provide detailed description.

Figure 8A:
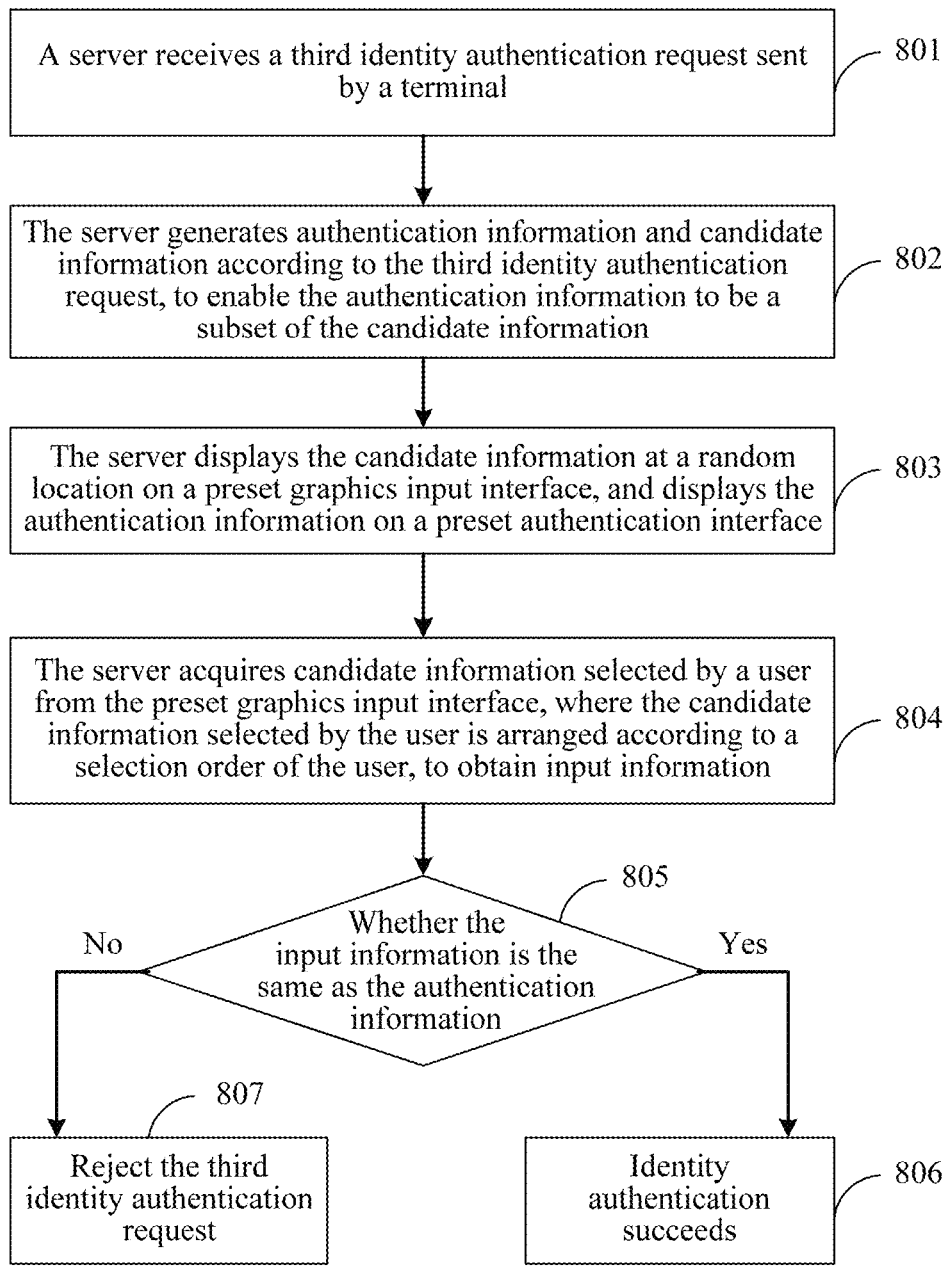
FIG. 8A is still another flowchart of an identity authentication method according to an embodiment of the present application.

As shown in FIG. 8A, a specific flowchart 800 of an identity authentication method may be as follows:

801: A server receives a third identity authentication request sent by a terminal.

The third identity authentication request may be sent when a user triggers an identity authentication trigger button. For example, the user may click or slide a trigger button such as "Log in", "Acquire CAPTCHA", "Unlock" or "Authenticate" to trigger the third identity authentication request.

802: The server generates authentication information and candidate information according to the third identity authentication request, to enable the authentication information to be a subset of the candidate information.

Various methods may be used to generate the candidate information and the authentication information. For example, the authentication information may be generated according to the third identity authentication request. Then, content of the authentication information is randomly arranged, and randomly generated content is added to the randomly arranged content, to obtain the candidate information.

An example in which the candidate information and the identity information are both characters is used. In this case, a CAPTCHA (that is, the authentication information) may be specifically generated according to the third identity authentication request. The CAPTCHA includes multiple characters, for example, "SY". Then, the multiple characters in the CAPTCHA are randomly arranged, and multiple other randomly generated characters are inserted, so as to obtain candidate characters (that is, the candidate information), for example, "WSWY".

For another example, the candidate information may first be generated according to the third identity authentication request. Then a preset quantity of content is randomly extracted from the candidate information, and the extracted content is arranged, to obtain the authentication information.

For example, similarly, an example in which the candidate information and the identity information are both characters is used. Multiple characters, for example, "WSWY", may be specifically generated according to the third identity authentication request. Then several characters are selected from the multiple characters, and the selected characters are arranged, to obtain the CAPTCHA, for example, "SY".

803: The server displays the candidate information at a random location on a preset graphics input interface, and displays the authentication information on a preset authentication interface.

For example, the candidate information may be specifically displayed at a random location in a preset input area on a preset page, for example, a web page on which identity authentication needs to be performed, and the authentication information is displayed in a preset authentication area. Then the page is sent to the terminal, and is displayed on a screen of the terminal.

For another example, the candidate information and the authentication information may further be directly sent to the terminal. For example, the terminal displays the candidate information at a random location on the preset graphics input interface, and displays the authentication information on a preset authentication interface.

Figure 8B:
FIG. 8B is a schematic diagram of a display interface in an identity authentication method according to an embodiment of the present application.

Forms, content, and sizes of both the preset graphics input interface and the preset authentication interface may be set according to a requirement of an actual application. An example in which the candidate information is "WSWY" and the authentication information is "SY" is used. In this case, "W", "S", "W", and "Y" may be displayed at random locations on the preset graphics input interface. Then, "SY" is displayed on the preset authentication interface. Referring to FIG. 8b, the big picture is a graphics input interface, and the small picture is an authentication interface.

Optionally, to make user operations convenient, when the authentication information is displayed, prompt information may further be generated, to prompt operations that the user specifically needs to perform. For example, as shown in FIG. 8B, "Please click the text in the big picture in order" or the like may be displayed on the identity authentication interface 850. In addition, another interface and/or trigger button may further be set on the identity authentication interface

850. For example, a refresh button, a trigger button of help information or the like may be set. Details are not further described herein.

Optionally, to improve security, when the candidate information and the authentication information are displayed, some interference information may further be added. Characters are used as an example. In this case, the characters may be deformed. Alternatively, some background images may be added to the characters.

Materials of the background images, the deformed characters or other interference information may be acquired locally. To save local storage resources, the materials may further be acquired from another device. Details are not further described herein.

804: The server acquires candidate information selected by a user from the preset graphics input interface, where the candidate information selected by the user is arranged according to a selection order of the user, to obtain input information.

For example, the user may select the candidate information from the preset graphics input interface. Then the terminal transfers the candidate information selected by the user to the server. The server arranges, according to a selection order of the user, the candidate information selected by the user, to obtain the input information.

For example, the CAPTCHA shown in FIG. 8b is still used as an example. In this case, for example, if the user sequentially clicks "W" and "S" in the big picture (the graphics input interface), the input information "WS" may be obtained. For another example, if the user sequentially clicks "S" and "Y" in the big picture (the graphics input interface), the input information "SY" may be obtained.

The terminal may directly arrange, according to a selection order of the user, the candidate information selected by the user. After the input information is obtained, the input information is transferred to the server. Details are not further described herein.

805: The server determines whether the input information is the same as the authentication information, and performs step 806 if the input information is the same as the authentication information, or performs step 807 if the input information is not the same as the authentication information.

An example in which the authentication information is "SY" is used. If it is determined in step 804 that the input information is "WS", in this case, it may be determined that the input information is not the same as the authentication information, and step 807 may be performed. If it is determined in step 804 that the input information is "SY", in this case, it may be determined that the input information is the same as the authentication information, and step 806 may be performed.

806: Determine that identity authentication succeeds when it is determined that the input information is the same as the authentication information. For example, a response that indicates that identity authentication succeeds may be returned to the terminal.

Optionally, the third identity authentication request may further carry the authentication information. In this case, after it is determined that the input information is the same as the authentication information, it may further be determined whether the authentication information is correct. The step of determining that identity authentication succeeds is performed only when if the authentication information is correct. Identity authentication fails if the authentication information is incorrect. In this case, the third identity authentication request may be rejected.

The authentication information refers to information, other than a CAPTCHA, used for identity authentication. For example, the authentication information may include a user account and a password or may further include other information such as a user name.

807: The server rejects the third identity authentication request when determining that the input information is not the same as the authentication information. For example, the server may return a response that indicates that identity authentication fails to the terminal.

Optionally, when the third identity authentication request is rejected, a cause why identity authentication fails, for example, an authentication information error or a CAPTCHA error, may further be prompted. Details are not further described herein.

It should be noted that, during specific implementation, the server may be one independent entity, or may include multiple entities. For example, the server may include a web server and a CAPTCHA server. In addition, the server may further include a material storage server or the like. Details are not further described herein.

As can be seen, according to this embodiment, authentication information and candidate information are generated according to a third identity authentication request of a user when the third identity authentication request is received. The candidate information is displayed at a random location on a preset graphics input interface, and the authentication information is displayed on a preset authentication interface. The authentication information and the candidate information have a predetermined correspondence. Candidate information selected by the user from the preset graphics input interface is then acquired, to obtain input information. The input information is matched against the authentication information. It is determined that identity authentication succeeds if the input information matches the authentication information. The third identity authentication request is rejected if the input information does not match the authentication information. Therefore, an objective of performing identity authentication on the user is achieved. In the solution, candidate information that can be selected by a user may be displayed at a random location on a preset graphics input interface. Therefore, it is very difficult for an intruder to find a fixed location to perform cracking, so that cracking difficulty is greatly increased. Moreover, in addition to the candidate information that can be displayed at a random location on the preset graphics input interface, authentication information in this embodiment of the present application also needs to be displayed on the preset authentication interface. Therefore, an intruder not only needs to crack the candidate information, but also needs to crack the authentication information on the authentication interface, so that cracking complexity is greatly increased. Further, corresponding backgrounds can be flexibly added to the candidate information and the authentication information, thereby enriching the backgrounds, so that more interference possibilities are provided. For example, there may be more selectable operations in color. For example, a color that is more indiscernible is selected as a character color. Therefore, as compared with the existing technology, higher security is achieved.

Embodiment 10

Figure 9:
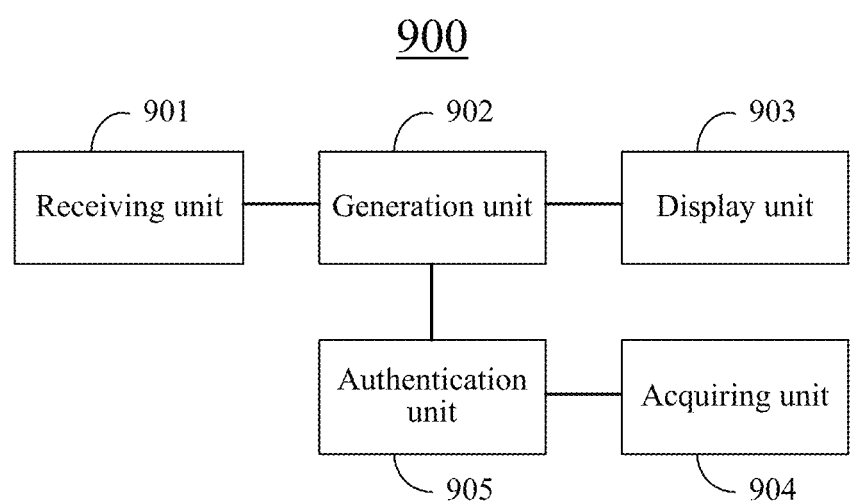
FIG. 9 is a schematic structural diagram of an identity authentication apparatus according to an embodiment of the present application.

To better implement the foregoing method, an embodiment of the present application further provides an identity authentication sub-apparatus. As shown in FIG. 9, the identity authentication sub-apparatus 900 may further include a receiving unit 901, a generation unit 902, a display unit 903, an acquiring unit 904, and an authentication unit 905 as follows:

(1) Receiving Unit 901

The receiving unit 901 is configured to receive a third identity authentication request of a user.

An example in which the identity authentication sub-apparatus 900 is integrated in a terminal is used. The receiving unit 901 may specifically receive the third identity authentication request sent when the user triggers an identity authentication trigger button. For example, the user may click or slide a trigger button such as "Log in", "Acquire CAPTCHA", "Unlock" or "Authenticate" to trigger the third identity authentication request.

For another example, if the identity authentication sub-apparatus 900 is integrated in a network side device, for example, a server, in this case, the receiving unit 901 may specifically receive the third identity authentication request sent by the terminal (or a client). The third identity authentication request may be sent when the user triggers the identity authentication trigger button. Details are not further described herein.

(2) Generation Unit 902

The generation unit 902 is configured to generate authentication information and candidate information according to the third identity authentication request, where the authentication information and the candidate information have a predetermined correspondence.

The predetermined correspondence may be set according to a requirement of an actual application. For example, the authentication information may be set to be a subset of the candidate information, that is, the authentication information is a part of content of the candidate information. Alternatively, the authentication information may be set to be an operation on the candidate information. That is:

The generation unit 902 may be specifically configured to: generate the authentication information according to the third identity authentication request, and generate the candidate information based on the authentication information, to enable the authentication information to be a subset of the candidate information.

Various manners may be used to generate the candidate information based on the authentication information. For example, content of the authentication information may be randomly arranged, and randomly generated content is added to the randomly arranged content, to obtain the candidate information.

Alternatively, the generation unit 902 may be specifically configured to: generate the candidate information according to the third identity authentication request, and determine the authentication information according to the candidate information, to enable the authentication information to be a subset of the candidate information.

Various manners may be used to determine the authentication information according to the candidate information. For example, a preset quantity of content may be randomly extracted from the candidate information, and the extracted content is arranged, to obtain the authentication information. The preset quantity may be set according to a requirement of an actual application.

Alternatively, the generation unit 902 may be specifically configured to: generate the candidate information according to the third identity authentication request, select operation target information from the candidate information, determine corresponding operation content according to the operation target information, and generate the authentication information according to the operation content.

The operation content may be set according to a requirement of an actual application. For example, the user may be required to input a part of information of the candidate information. If the candidate information is multiple articles displayed at random locations on a background picture, in this case, the user may be required to click an article or a type of articles on the picture to perform authentication. Alternatively, the user may further be required to perform another operation on the candidate information. For example, if the candidate information is several people with an umbrella and without an umbrella on a background picture, in this case, the user may be required to move a held umbrella into the hand of a person without an umbrella on the background picture. Examples are no longer enumerated herein.

It should be noted that, the candidate information and the authentication information in this embodiment of the present application may be characters, for example, Chinese text or English letters, or may be images.

(3) Display Unit 903

The display unit 903 is configured to: display the candidate information at a random location on a preset graphics input interface, and display the authentication information on a preset authentication interface.

Forms, content, and sizes of both the preset graphics input interface and the preset authentication interface may be set according to a requirement of an actual application. Details are not further described herein.

Optionally, to make user operations convenient, when the authentication information is displayed, prompt information may further be generated, to prompt operations that the user specifically needs to perform, that is, the identity authentication sub-apparatus 900 may further include a prompt unit as follows:

The prompt unit may be configured to: when the authentication information is displayed, generate prompt information, where the prompt information instructs the user to select corresponding candidate information on the preset graphics input interface as input information according to the displayed authentication information.

(4) Acquiring Unit 904

The acquiring unit 904 is configured to acquire candidate information selected by the user from the preset graphics input interface, to obtain the input information;

For example, the acquiring unit 904 may be specifically configured to: acquire the candidate information selected by the user from the preset graphics input interface, and arrange, according to a selection order of the user, the candidate information selected by the user, to obtain the input information.

(5) Authentication Unit 905

The authentication unit 905 is configured to: determine whether the input information matches the authentication information; and determine that identity authentication succeeds if the input information matches the authentication information; or reject the third identity authentication request if the input information does not match the authentication information.

An example in which the authentication information is a subset of the candidate information is used, in this case, the authentication unit 905 may specifically determine whether the input information is the same as the authentication information; and determine that the input information matches the authentication information if the input information is the same as the authentication information; or determine that the input information does not match the authentication information if the input information is not the same as the authentication information.

Another example in which the authentication information is a particular operation on the candidate information is used. In this case, the authentication unit 905 may specifically determine whether the input information meets corresponding operation content; and determine that the input information matches the authentication information if the input information meets the corresponding operation content; or determine that the input information does not match the authentication information if the input information does not meet the corresponding operation content.

Optionally, the third identity authentication request may further carry the authentication information. In this case, it may further be determined whether the authentication information is correct after it is determined that the input information matches the authentication information. The operation of determining that identity authentication succeeds is performed only if the authentication information is correct. Identity authentication fails if the authentication information is incorrect, and in this case, the third identity authentication request may be rejected. That is:

The authentication unit 905 may be specifically configured to: determine whether the input information matches the authentication information; and determine that identity authentication succeeds if the input information matches the authentication information and when it is determined that the authentication information is correct; or reject the third identity authentication request if the input information does not match the authentication information.

The authentication information refers to information, other than a CAPTCHA, used for identity authentication. For example, the authentication information may include a user account and a password or may further include other information such as a user name.

In addition, optionally, to improve security, when the candidate information and the authentication information are displayed, some interference information may further be added. Characters are used as an example. In this case, for example, the characters may be deformed. Alternatively, some background images may be added to the characters. That is, optionally, particular background images may be set for both the preset graphics input interface and preset authentication interface. The background images may be flexibly set. That is, the identity authentication sub-apparatus 900 may further include a setting unit as follows:

The setting unit may be configured to: receive a first setting request of the user, where the first setting request indicates a background image that needs to be used, and replace a background of the graphics input interface with the background image according to the first setting request; and/or, The setting unit may be configured to: receive a second setting request of the user, where the second setting request indicates a background image that needs to be used, and replace a background of the authentication interface with the background image according to the second setting request.

During specific implementation, the foregoing units may be implemented as independent entities, or may be arbitrarily combined and implemented as a same entity or several entities. For specific implementation of the foregoing units, refer to the foregoing method embodiments. Details are not further described herein.

The identity authentication sub-apparatus 900 may be specifically integrated in a terminal, a server or another device that needs to perform identity authentication.

As can be seen, according to the identity authentication sub-apparatus 900 in this embodiment, the generation unit 902 may generate authentication information and candidate information according to a third identity authentication request of a user when the third identity authentication request is received. The display unit 903 displays the candidate information at a random location on a preset graphics input interface, and displays the authentication information on a preset authentication interface. The authentication information and the candidate information have a predetermined correspondence. The acquiring unit 904 then acquires candidate information selected by the user from the preset graphics input interface, to obtain input information. The authentication unit 905 matches the input information against the authentication information, and determines that identity authentication succeeds if the input information matches the authentication information, or rejects the third identity authentication request if the input information does not match the authentication information. Therefore, an objective of performing identity authentication on the user is achieved. In the solution, candidate information that can be selected by a user may be displayed at a random location on a preset graphics input interface. Therefore, it is very difficult for an intruder to find a fixed location to perform cracking, so that cracking difficulty is greatly increased. Moreover, in addition to the candidate information that can be displayed at a random location on the preset graphics input interface, authentication information in this embodiment of the present application also needs to be displayed on the preset authentication interface. Therefore, an intruder not only needs to crack the candidate information, but also needs to crack the authentication information on the authentication interface, so that cracking complexity is greatly increased. Therefore, as compared with the existing technology, higher security is achieved.

Embodiment 11

Figure 10:
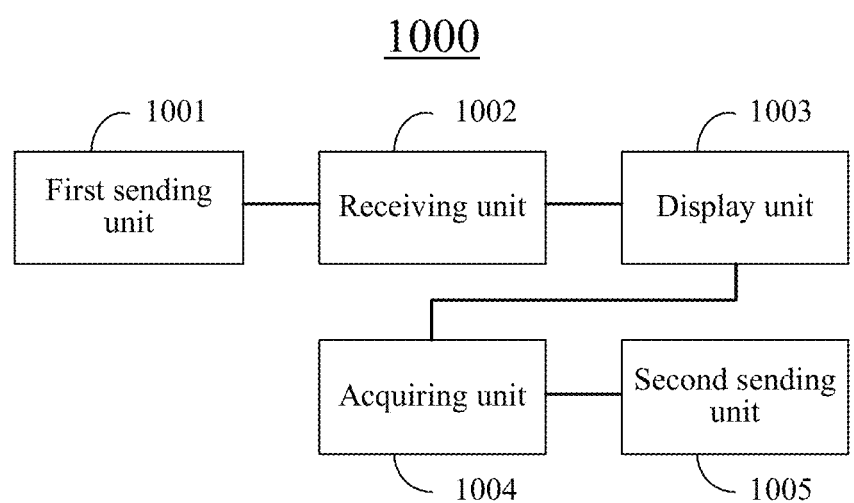
FIG. 10 is a schematic structural diagram of an identity authentication triggering apparatus according to an embodiment of the present application.

Correspondingly, this embodiment of the present application further provides an identity authentication trigger sub-apparatus. As shown in FIG. 10, the identity authentication trigger sub-apparatus 1000 includes a first sending unit 1001, a receiving unit 1002, a display unit 1003, an acquiring unit 1004, and a second sending unit 1005 as follows:

(1) First Sending Unit 1001

The first sending unit 1001 is configured to send a third identity authentication request to a server.

For example, the first sending unit 1001 may receive a third identity authentication request triggered by a user. For example, the user may click or slide a trigger button such as "Log in", "Acquire CAPTCHA", "Unlock" or "Authenticate" to trigger the third identity authentication request. The first sending unit 1001 then sends the third identity authentication request to the server.

(2) Receiving Unit 1002

The receiving unit 1002 is configured to receive authentication information and candidate information that are returned by the server according to the third identity authentication request.

For details of a method for generating, by the server, the authentication information and the candidate information according to the third identity authentication request, refer to Embodiment 1. Details are not further described herein.

The authentication information and the candidate information have a predetermined correspondence. The predetermined correspondence may be set according to a requirement of an actual application. For example, the authentication information may be set to be a subset of the candidate information. That is, the authentication information is a part of content of the candidate information. Alternatively, the authentication information may be set to be an operation on the candidate information.

(3) Display Unit 1003

The display unit 1003 is configured to: display the candidate information at a random location on a preset graphics input interface, and display the authentication information on a preset authentication interface.

The graphics input interface includes multiple input interfaces. Corresponding input information may be acquired by selecting, for example, clicking or sliding content on the graphics input interface. Forms, content, and sizes of both the preset graphics input interface and the preset authentication interface may be set according to a requirement of an actual application. Details are not further described herein.

Optionally, to make user operations convenient, when the authentication information is displayed, prompt information may further be generated, to prompt operations that the user specifically needs to perform. An example in which the authentication information is a subset of the candidate information is used. In this case, the user may be prompted to select corresponding candidate information on the preset graphics input interface as the input information according to the displayed authentication information, for example, to select a corresponding character or to click a corresponding location on an image. That is, the identity authentication trigger sub-apparatus 1000 may further include a prompt unit as follows:

The prompt unit is configured to generate prompt information, where the prompt information instructs the user to select corresponding candidate information on the preset graphics input interface as the input information according to the displayed authentication information.

Optionally, to improve security, when the candidate information and the authentication information are displayed, some interference information may further be added. Characters are used as an example. In this case, the characters may be deformed. Alternatively, some background images may be added to the characters. That is, optionally, particular background images may be set for both the preset graphics input interface and the preset authentication interface. The background image may be flexibly set. That is, the identity authentication trigger sub-apparatus 1000 may further include a setting unit, configured to:

receive a third setting request of the user, where the third setting request indicates a background image that needs to be used, and replace a background of the graphics input interface with the background image according to the third setting request; or receive a fourth setting request of the user, where the fourth setting request indicates a background image that needs to be used, and replace a background of the authentication interface with the background image according to the fourth setting request.

(4) Acquiring Unit 1004

The acquiring unit 1004 is configured to acquire candidate information selected by the user from the preset graphics input interface, to obtain the input information.

For example, the acquiring unit 1004 may be specifically configured to: acquire the candidate information selected by the user from the preset graphics input interface, and arrange, according to a selection order of the user, the candidate information selected by the user, to obtain the input information.

(5) Second Sending Unit 1005

The second sending unit 1005 is configured to send the input information to the server, so that the server matches the input information against the authentication information, to perform identity authentication.

During specific implementation, the foregoing units may be implemented as independent entities, or may be arbitrarily combined and implemented as a same entity or several entities. For specific implementation of the foregoing units, refer to the foregoing method embodiments. Details are not further described herein.

The identity authentication trigger sub-apparatus 1000 may be integrated in a terminal, for example, installed in the terminal in a form of a client or other software. The terminal may specifically include a device such as a mobile phone, a tablet computer, a notebook computer or a PC.

As can be seen, according to the identity authentication trigger sub-apparatus 1000 in this embodiment, the first sending unit 1001 may send a third identity authentication request to a server. Then the receiving unit 1002 receives authentication information and candidate information that are returned by the server according to the third identity authentication request. The display unit 1003 displays the candidate information at a random location on a preset graphics input interface, and displays the authentication information on a preset authentication interface. The authentication information and the candidate information have a predetermined correspondence. Then the acquiring unit 1004 acquires candidate information selected by a user from the preset graphics input interface, to obtain input information. The second sending unit 1005 provides the input information to the server to perform identity authentication. In the solution, candidate information that can be selected by a user may be displayed at a random location on a preset graphics input interface. Therefore, it is very difficult for an intruder to find a fixed location to perform cracking, so that cracking difficulty is greatly increased. Moreover, in addition to the candidate information that can be displayed at a random location on the preset graphics input interface, authentication information in this embodiment of the present application also needs to be displayed on the preset authentication interface. Therefore, an intruder not only needs to crack the candidate information, but also needs to crack the authentication information on the authentication interface, so that cracking complexity is greatly increased. Therefore, as compared with the existing technology, higher security is achieved.

Embodiment 12

In addition, this embodiment of the present application further provides an identity authentication system. The identity authentication system may include any identity authentication sub-apparatus provided in the embodiments of the present application. For details, refer to Embodiment 4. Details are not further described herein.

The identity authentication sub-apparatus may be specifically integrated in a device such as a terminal or a server.

If the identity authentication sub-apparatus is integrated in the server, the identity authentication system may further include any identity authentication trigger sub-apparatus provided in the embodiments of the present application. For details, refer to Embodiment 5. Details are not further described herein.

An example in which the identity authentication sub-apparatus is specifically integrated in the server and the identity authentication trigger sub-apparatus is specifically integrated in the terminal is used. Details may be as follows:

The server is configured to: receive a third identity authentication request of a user; generate authentication information and candidate information according to the third identity authentication request, where the authentication information and the candidate information have a predetermined correspondence; send the authentication information and the candidate information to the terminal; receive input information sent by the terminal; determine whether the input information matches the authentication information; determine that identity authentication succeeds if the input information matches the authentication information; or reject the third identity authentication request if the input information does not match the authentication information.

The terminal is configured to: send a third identity authentication request to the server, receive the authentication information and the candidate information that are returned by the server according to the third identity authentication request, display the candidate information at a random location on a preset graphics input interface, display the authentication information on a preset authentication interface, acquire candidate information selected by the user from the preset graphics input interface, to obtain input information, and send the input information to the server.

The graphics input interface includes multiple input interfaces. Corresponding input information may be acquired by selecting, for example, clicking or sliding content on the graphics input interface. Forms, content, and sizes of both the preset graphics input interface and the preset authentication interface may be set according to a requirement of an actual application. Details are not further described herein.

Optionally, to make user operations convenient, when displaying the authentication information, the terminal may further generate prompt information, to prompt operations that the user specifically needs to perform.

For specific implementation of the foregoing devices, refer to the foregoing embodiments. Details are not further described herein.

Optionally, the identity authentication system may further include another device, for example, a storage server or a material server. The storage server is configured to store data. The material server is configured to provide materials (that is, data) that are needed to generate the candidate information and the authentication information. Details are not further described herein.

The identity authentication system may include any identity authentication sub-apparatus provided in the embodiments of the present application. Therefore, the identity authentication system can implement beneficial effects that can be implemented by any identity authentication sub-apparatus provided in the embodiments of the present application. Details are not further described herein.

An anti-hacking capability of an embodiment of the present application is analyzed below.

Figure 11:
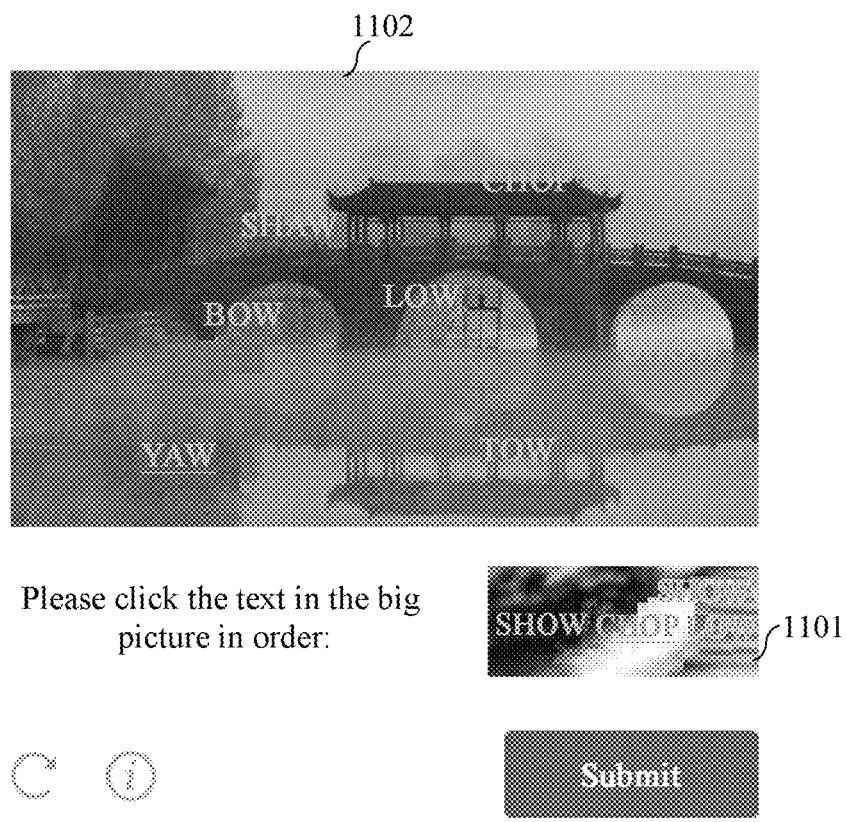
FIG. 11 is a schematic diagram of a CAPTCHA in a solution according to an embodiment of the present application.

Referring to FIG. 11, an example in which an authentication interface is the small picture 1101 in FIG. 11 and an input interface is the big picture 1102 in FIG. 11 is used. As shown in FIG. 11, the text in the small picture 1101 is the question of a CAPTCHA. Therefore, for the countermeasures here, decades of experience in countermeasures of previous Chinese, animation, character CAPTCHAs may be used. A font and an interference type of the text can be changed highly flexibly, making it excessively difficult for an illegal intruder to perform cracking. There are abundant resources for the big picture 1102, and a large variety of types can be selected, so that types and content are not limited. A character label generated in each image may be related to or may be not related to the content of the image, making flexibility excessively high. Therefore, it is also very difficult for the illegal intruder to perform cracking on the character label. In addition, any position in the big picture 1102 (that is, the candidate information may be located at any location on the big picture) is clickable. Therefore, it is very difficult for the illegal intruder to locate a correct coordinate location by using foreground information. If the illegal intruder intends to perform text recognition by using an optical character recognition (OCR) method, different fonts, different sizes and/or different interference may be used for characters, thereby increasing the difficulty of recognition.

Based on the foregoing analysis, the anti-hacking capability of this embodiment against three methods, that is, character recognition, template matching, and brute-force cracking, are evaluated. The following evaluation results may be obtained:

Character recognition method: A cracking rate is less than 1%

Template matching recognition method: A cracking rate is less than 1%

Brute-force cracking recognition method: When there are four groups of characters, a cracking rate is less than 0.06% (when there are four groups of characters, actually two to five groups of characters may be randomly delivered; Chinese may be changed to characters).

FIG. 11 is used as an example. Detailed analysis is as follows:

(1) Character Recognition Method

When performing cracking, an illegal intruder needs to first recognize that four groups of characters in a small picture 1101 (that is, the lower one of the two pictures in FIG. 11) are SHOW, CHOP, LOW and SHOP. Then each group of characters is recognized from a big picture 1102 (that is, the upper one of the two pictures in FIG. 11), to find the locations of the four groups of characters SHOW, CHOP, LOW, and SHOP.

Without any deformation or interference, a cracking rate of a single picture is the same as that of an existing character CAPTCHA with a natural-scene background. For example, a cracking rate of an existing character with a natural-scene background is 10%. In this case, theoretically, a probability that two pictures are cracked is 10%*10%=1%.

Based on this recognition method, the following anti-hacking method may be used:

In consideration of the impact of interference characters and the impact of an order in the foregoing big picture 1102, a cracking rate of the upper picture should be less than 10%. Therefore, a cracking rate of the two pictures is less than 1%. In addition, because the upper picture is a big picture and is much larger than a conventional character CAPTCHA, there may be richer backgrounds. Therefore, more interference possibilities, for example, interference in color, are provided.

(2) Template Matching Method

When performing cracking, an illegal intruder needs to sequentially extract a foreground image of each character from the big picture 1102, and then sequentially performs differential calculation on the foreground image of each character and a foreground character of the small picture 1101 to find a most similar character location.

Based on this recognition method, the following anti-hacking method may be used:

In the big picture 1102 and the small picture 1101 (that is, an upper picture and a lower picture), different fonts are preferably selected. Further, for interference characters in the big picture 1102, words that have similar spellings may be preferably selected. The words that have similar spellings are, for example, SHOP and SHOT, READ and REED, WOOD and WORD, and SEAT and SEAL. In addition, some interference may further be added to the characters. For example, a box or a circle may be added to the characters. In this way, when similarities of the characters are determined, it is very easy to determine characters with boxes to be similar or deformed. The accuracy of template matching is lower than that of a character recognition method. The foregoing anti-hacking technical solution is then added. Therefore, a cracking rate should be lower than that of the character recognition method. Therefore, a cracking rate of the template matching method is less than 1%.

(3) Brute-Force Cracking Method

When performing cracking, an illegal intruder only needs to find the location of a foreground character. Without performing any recognition or matching, the illegal intruder randomly attempts to click an answer. It may be obtained through calculation that a cracking rate of the brute-force cracking method is less than 0.06%.

In conclusion, cracking rates of all the three cracking methods are less than 1%. Moreover, a CAPTCHA has a big picture, so that subsequently more and richer interference and deformation can be performed. In addition, some interference information may be added to a small picture. Therefore, as compared with the existing technology, an anti-hacking capability of the present application can be greatly improved, and higher security can be achieved.

Embodiment 13

An embodiment of the present disclosure further provides a server. Specifically:

The server may include components such as a processor including one or more processing cores, a memory including one or more computer readable storage media, a radio frequency (RF) circuit, a power supply, an input unit, and a display unit. A person skilled in the art may understand that the structure of the server does not constitute a limitation to the server, and the server may include more components or fewer components than those shown in the foregoing, or some components may be combined, or a different component deployment may be used.

The processor is the control center of the server, and is connected to various parts of the entire server by using various interfaces and lines. By running or executing the software program and/or module stored in the memory, and invoking data stored in the memory, the processor performs various functions and data processing of the server, thereby performing overall monitoring on the server. Optionally, the processor may include one or more processing cores. Preferably, the processor may integrate an application processor and a modem. The application processor mainly processes an operating system, a user interface, an application program, and the like. The modem mainly processes wireless communication. It may be understood that the foregoing modem may also not be integrated into the processor.

The memory may be configured to store a software program and module. The processor runs the software program and module stored in the memory, to implement various functional applications and data processing. The memory may mainly include a program storage area and a data storage area. The program storage area may store an operating system, an application program required by at least one function (such as a sound playback function and an image display function), and the like. The data storage area may store data created according to use of the server, and the like. In addition, the memory may include a high speed random access memory, and may also include a non-volatile memory such as at least one magnetic disk storage device, a flash memory, or another volatile solid-state storage device. Correspondingly, the memory may further include a memory controller, so as to provide access of the processor to the memory.

The RF circuit may be configured to receive and send signals during an information receiving and sending process. Particularly, the RF circuit receives downlink information from a base station, then delivers the downlink information to one or more processors for processing, and sends related uplink data to the base station. Generally, the RF circuit includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The server further includes the power supply (such as a battery) for supplying power to the components. Preferably, the power supply may be logically connected to the processor by using a power management system, thereby implementing functions such as charging, discharging and power consumption management by using the power management system. The power supply may further include one or more of a direct current or alternating current power supply, a re-charging system, a power failure detection circuit, a power supply converter or inverter, a power supply state indicator, and any other components.

The server may further include an input unit. The input unit may be configured to receive input digit or character information, and generate a keyboard, mouse, joystick, optical, or track ball signal input related to the user setting and function control. Specifically, in a specific embodiment, the input unit may include a touch-sensitive surface and another input device. The touch-sensitive surface, which may also be referred to as a touch screen or a touch panel, may collect a touch operation of a user on or near the touch-sensitive surface (such as an operation of a user on or near the touch-sensitive surface by using any suitable object or accessory, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor. Moreover, the touch controller can receive and execute a command sent from the processor. In addition, the touch-sensitive surface may be may be a resistive, capacitive, infrared, or surface sound wave type touch-sensitive surface. In addition to the touch-sensitive surface, the input unit may further include the another input device. Specifically, the another input device may include, but is not limited to, one or more of a physical keyboard, a functional key (such as a volume control key or a switch key), a track ball, a mouse, and a joystick.

The display unit may be configured to display information input by the user or information provided for the user, and various graphical user interfaces of the server. The graphical user interfaces may be formed by a graph, a text, an icon, a video, or any combination thereof. The display unit may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor, so as to determine the type of the touch event. Then, the processor provides a corresponding visual output on the display panel according to the type of the touch event. Although, in this embodiment, the touch-sensitive surface and the display panel are used as two separate parts to implement input and output functions, in some embodiments, the touch-sensitive surface and the display panel may be integrated to implement the input and output functions.

Although not shown in the figure, the server may further include a camera, a Bluetooth module, and the like, which are not further described herein. Details are not further described herein. Specifically, in this embodiment, the processor in the server loads, according to the following instructions, executable files corresponding to a process of one or more application programs into the memory, and the processor runs the application programs stored in the memory, so as to implement various functions as follows:

receiving a security authentication request sent by a terminal; acquiring network environment information and user behavior data according to the security authentication request; determining, according to the network environment information and the user behavior data, whether a current operation is a machine attack; and acquiring a CAPTCHA of a predetermined type according to a predetermined policy and delivering the CAPTCHA to the terminal if the current operation is a machine attack, to perform identity authentication; or determining that security authentication succeeds if the current operation is not a machine attack.

In addition, the processor may further implement the following functions:

receiving a third identity authentication request of a user; generating authentication information and candidate information according to the third identity authentication request, where the authentication information and the candidate information have a predetermined correspondence; displaying the candidate information at a random location on a preset graphics input interface, and displaying the authentication information on a preset authentication interface; acquiring candidate information selected by the user from the preset graphics input interface, to obtain input information; determining whether the input information matches the authentication information; and determining that identity authentication succeeds if the input information matches the authentication information; or rejecting the third identity authentication request if the input information does not match the authentication information.

For specific implementation of the foregoing operations, refer to the foregoing embodiments. Details are not further described herein.

The server may achieve beneficial effects that can be achieved by any apparatus provided in the embodiments of the present application. For details, refer to the foregoing embodiment. Details are not further described herein.

A person of ordinary skill in the art may understand that all or some of the steps in the methods in the foregoing embodiments may be implemented by a program instructing relevant hardware. The program may be stored in a computer readable storage medium. The storage medium may be a read-only memory (ROM), a random access memory (RAM), a magnetic disk, an optical disc, or the like.

The identity authentication method, apparatus, and system provided in the embodiments of the present application are described in detail above. The principle and implementation of the present application are described herein through specific examples. The description about the embodiments of the present application is merely provided for ease of understanding of the method and core ideas of the present application. Persons skilled in the art can make variations and modifications to the present application in terms of the specific implementations and application scopes according to the ideas of the present application. Therefore, the specification shall not be construed as a limit to the present application.

What is claimed is:

1. A method including:
at a server:
receiving an identity authentication request associated with a user;
generating authentication information based on the identity authentication request, the identity authentication request defines an order for the authentication information;
generating candidate information based on the authentication information, where the candidate information includes the authentication information and randomly generated information, such that the authentication information is a subset of the candidate information;
selecting a first background image for presentation as a background for the candidate information;
causing a display of the candidate information at a display location selected randomly from among preset locations within the first background image on a graphic input interface;
causing a display of at least a portion of the authentication information on an authentication interface different from the graphic input interface;
receiving, from user input via the graphic input interface, an input selection from among the candidate information;
determining whether the input selection is matched to the authentication information by determining that the input selection indicates content of the authentication information and the order for the authentication information;
at a time that the input selection is matched to the authentication information, causing issuance an authentication request success message; and
at a time that the input selection is not matched to the authentication information, causing issuance of an authentication request rejection,
wherein generating the authentication information including determining a complexity of the authentication information to be generated based on a security requirement of an application to be provided to the user.

2. The method of claim 1, where the authentication information includes images.

3. The method of claim 1, where the authentication information includes a CAPTCHA.

4. The method of claim 1, where the server is distributed over multiple physical locations.

5. The method of claim 1, where the candidate information is sent to a terminal to support authentication.

6. The method of claim 1, wherein the at least a portion of the authentication information is displayed within a second background image and elements of the candidate information are misaligned with each other and are scattered within the first background image.

7. The method of claim 1, wherein generating the authentication information includes generating different types of the authentication information based on the complexity.

8. The method of claim 1, where the authentication information includes characters.

9. The method of claim 8, where the characters include deformed characters.

10. A system including:
a server, including a memory and a hardware processor, the server configured to:
receive an identity authentication request associated with a user;
determine a complexity of authentication information to be generated based on a security requirement of an application to be provided to the user;
generate the authentication information based on the identity authentication request and the complexity of the authentication information, the identity authentication request defines an order for the authentication information;
generate candidate information based on the authentication information, where the candidate information includes the authentication information and randomly generated information, such that the authentication information is a subset of the candidate information;
select a first background image for presentation as a background for the candidate information;
cause a display of the candidate information at a display location selected randomly from among preset locations within the first background image on a graphic input interface;
cause a display of at least a portion of the authentication information on an authentication interface different from the graphic input interface;
receive, from user input via the graphic input interface, an input selection from among the candidate information;
determine whether the input selection is matched to the authentication information by determining that the input selection indicates content of the authentication information and the order for the authentication information;
at a time that the input selection is matched to the authentication information, cause issuance an authentication request success message; and
at a time that the input selection is not matched to the authentication information, cause issuance of an authentication request rejection.

11. The system of claim 10, where the authentication information includes images.

12. The system of claim 10, where the authentication information includes a CAPTCHA.

13. The system of claim 10, wherein the at least a portion of the authentication information is displayed within a second background image and elements of the candidate information are misaligned with each other and are scattered within the first background image.

14. The system of claim 10, wherein the server is further configured to generate different types of the authentication information based on the complexity.

15. The system of claim 10, where the authentication information includes characters.

16. The system of claim 15, where the characters include deformed characters.

17. A product including:
non-transitory machine-readable media; and
instructions stored on the non-transitory machine-readable media, the instructions configured to, when executed, cause a machine to:
at a server:
receive an identity authentication request associated with a user;
determine a complexity of authentication information to be generated based on a security requirement of an application to be provided to the user;
generate the authentication information based on the identity authentication request and the complexity of the authentication information, the identity authentication request defines an order for the authentication information;
generate candidate information based on the authentication information, where the candidate information includes the authentication information and randomly generated information, such that the authentication information is a subset of the candidate information;
select a first background image for presentation as a background for the candidate information;
cause a display of the candidate information at a display location selected randomly from among preset locations within the first background image on a graphic input interface;
cause a display of at least a portion of the authentication information on an authentication interface different from the graphic input interface;
receive, from user input via the graphic input interface, an input selection from among the candidate information;
determine whether the input selection is matched to the authentication information by determining that the input selection indicates content of the authentication information and the order for the authentication information;
at a time that the input selection is matched to the authentication information, cause issuance an authentication request success message; and
at a time that the input selection is not matched to the authentication information, cause issuance of an authentication request rejection.

18. The product of claim 17, where the server is distributed over multiple physical locations.

19. The product of claim 17, where the candidate information is sent to a terminal to support authentication.

20. The product of claim 17, wherein the machine is further caused to generate different types of the authentication information based on the complexity.

* * * * *